US012735611B2

(12) United States Patent
Moughton et al.

(10) Patent No.: US 12,735,611 B2
(45) Date of Patent: Sep. 15, 2026

(54) (METH)ACRYLIC-EPOXY UV INITIATED ADHESIVE COMPOSITIONS AND ADHESIVE-CONTAINING ARTICLES

(71) Applicant: 3M INNOVATIVE PROPERTIES COMPANY, St. Paul, MN (US)

(72) Inventors: Adam O. Moughton, Minneapolis, MN (US); Kathleen S. Shafer, Woodbury, MN (US); Andrew Satrijo, St. Paul, MN (US); Michael J. Maher, St. Paul, MN (US); Deborah K. Schneiderman, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 218 days.

(21) Appl. No.: 18/579,545

(22) PCT Filed: Aug. 19, 2022

(86) PCT No.: PCT/IB2022/057792

§ 371 (c)(1),
(2) Date: Jan. 16, 2024

(87) PCT Pub. No.: WO2023/037185

PCT Pub. Date: Mar. 16, 2023

(65) Prior Publication Data

US 2024/0343952 A1 Oct. 17, 2024

Related U.S. Application Data

(60) Provisional application No. 63/261,114, filed on Sep. 13, 2021.

(51) Int. Cl.

| | |
|---|---|
| ***C09J 133/08*** | (2006.01) |
| ***B32B 7/12*** | (2006.01) |
| ***C08F 220/28*** | (2006.01) |
| ***C08K 5/00*** | (2006.01) |
| ***C08K 5/36*** | (2006.01) |
| ***C08L 33/08*** | (2006.01) |
| ***C08L 53/00*** | (2006.01) |
| ***C08L 63/00*** | (2006.01) |
| ***C09J 7/40*** | (2018.01) |
| ***C09J 163/00*** | (2006.01) |

(52) U.S. Cl.

CPC ............... *C09J 133/08* (2013.01); *B32B 7/12* (2013.01); *C08F 220/285* (2020.02); *C08K 5/0025* (2013.01); *C08K 5/36* (2013.01); *C08L 33/08* (2013.01); *C08L 53/00* (2013.01); *C08L 63/00* (2013.01); *C09J 7/40* (2018.01); *C09J 163/00* (2013.01); *C08L 2205/025* (2013.01); *C09J 2203/326* (2013.01); *C09J 2301/408* (2020.08); *C09J 2433/00* (2013.01); *C09J 2453/00* (2013.01); *C09J 2463/00* (2013.01)

(58) Field of Classification Search

None

See application file for complete search history.

(56) References Cited

U.S. PATENT DOCUMENTS

| | | | | |
|---|---|---|---|---|
| 4,737,593 | A | 4/1988 | Ellrich et al. | |
| 5,288,802 | A | 2/1994 | Walters et al. | |
| 5,913,970 | A | 6/1999 | Atkins et al. | |
| 6,734,256 | B1 | 5/2004 | Everaerts et al. | |
| 6,806,320 | B2 | 10/2004 | Everaerts et al. | |
| 7,255,920 | B2 | 8/2007 | Everaerts et al. | |
| 8,039,104 | B2 * | 10/2011 | Everaerts | C09J 7/38 428/522 |
| 8,440,304 | B2 | 5/2013 | Paul et al. | |
| 8,709,596 | B2 | 4/2014 | Jauer et al. | |
| 9,393,589 | B2 | 7/2016 | Olmeijer et al. | |
| 9,512,340 | B2 | 12/2016 | Wigdorski et al. | |
| 10,134,566 | B2 | 11/2018 | David et al. | |
| 10,329,464 | B2 | 6/2019 | Chen et al. | |
| 10,400,055 | B2 | 9/2019 | Griesgraber et al. | |
| 10,526,511 | B2 | 1/2020 | Hartinger et al. | |
| 10,640,686 | B2 | 5/2020 | Roscoe et al. | |
| 10,913,807 | B2 | 2/2021 | Yurt et al. | |
| 10,961,417 | B2 * | 3/2021 | Suzuki | B32B 7/12 |
| 2002/0182955 | A1 | 12/2002 | Weglewski et al. | |
| 2009/0308534 | A1 | 12/2009 | Malone | |

(Continued)

FOREIGN PATENT DOCUMENTS

| | | | |
|---|---|---|---|
| EP | 2888331 | B1 | 3/2019 |
| EP | 2857428 | B1 | 9/2020 |

(Continued)

OTHER PUBLICATIONS

NOF Corp. data sheet for Blemmer PME-400 (Year: 2015).*

(Continued)

*Primary Examiner* — Frank D Ducheneaux

(74) *Attorney, Agent, or Firm* — Adrian L. Pishko

(57) ABSTRACT

Curable and cured compositions as well as articles that contain the curable or cured compositions are provided. The curable composition comprises (a) a (meth)acrylic-based multiblock copolymer, (b) a random (meth)acylate copolymer comprising a monomeric unit having a pendant poly (alkylene oxide) group, wherein the monomeric unit having the pendant poly(alkylene oxide) group has a number average molecular weight of at least 300 Daltons, (c) an epoxy resin, and (d) a cationic photoinitiator. Articles containing the curable composition can be die-cut and can retain their dimensions with minimal oozing when stored under ambient conditions.

16 Claims, No Drawings

(56) References Cited

U.S. PATENT DOCUMENTS

| | | | | |
|---|---|---|---|---|
| 2014/0295183 | A1* | 10/2014 | Yamagata | C09J 7/22 525/200 |
| 2015/0030839 | A1 | 1/2015 | Satrijo et al. | |
| 2019/0077997 | A1 | 3/2019 | Demarez et al. | |
| 2020/0040237 | A1 | 2/2020 | Kopf et al. | |
| 2020/0131285 | A1 | 4/2020 | Brown et al. | |
| 2020/0157386 | A1 | 5/2020 | Kim et al. | |
| 2021/0095097 | A1 | 4/2021 | Lewandowski et al. | |
| 2021/0206897 | A1 | 7/2021 | Volp et al. | |

FOREIGN PATENT DOCUMENTS

| | | | |
|---|---|---|---|
| WO | 2013049133 | A1 | 4/2013 |
| WO | 2018217519 | A1 | 11/2018 |
| WO | 2019003138 | A1 | 1/2019 |
| WO | 2019118685 | A1 | 6/2019 |
| WO | 2019166919 | A1 | 9/2019 |
| WO | 2019229695 | A1 | 12/2019 |
| WO | 2019239346 | A1 | 12/2019 |
| WO | 2020217161 | A1 | 10/2020 |
| WO | 2020250066 | A1 | 12/2020 |
| WO | 2022043784 | A1 | 3/2022 |
| WO | 2022123341 | A1 | 6/2022 |
| WO | 2022144734 | A1 | 7/2022 |

OTHER PUBLICATIONS

Bergbreiter, "“Click”-Based Covalent Layer-By-Layer Assembly on Polyethylene Using Water-Soluble Polymeric Reagents", Macromolecules, 2007, vol. 40, pp. 5337-5343.

Borges, "Molecular Interactions Driving the Layer-By-Layer Assembly of Multilayers", Chemical Reviews, 2014, vol. 114, 8883-8942.

International Search report for PCT International Application No. PCT/IB2022/057792, mailed on Dec. 23, 2022, 4 pages.

Kharlampieva, et al., "Hydrogen-Bonded Layer-by-Layer Polymer Films", Journal of Macromolecular Science, Part C: Polymer Reviews, vol. 46, Issue 4, pp. 377-395.

* cited by examiner

(METH)ACRYLIC-EPOXY UV INITIATED ADHESIVE COMPOSITIONS AND ADHESIVE-CONTAINING ARTICLES

BACKGROUND

New adhesives are needed in the electronics and in various industrial applications. For example, in electronic devices, particularly mobile electronic devices (e.g., hand-held, or wearable electronic devices), various adhesives such as pressure-sensitive adhesives are used to bond the cover glass (or lens) to the underlying display module, bond the touch sensor to the cover glass and display, or bond the lower components of the display to the housing. The selected adhesive typically should have sufficiently high adhesive strength to properly maintain good adhesion to those components, not only when the mobile electronic devices are operating under normal conditions, but also when they are subjected to traumatic forces (e.g., when impacted and/or dropped onto a hard surface).

Some electronics original equipment manufacturers (OEMs) evaluate the drop resistance of a candidate adhesive composition using a tensile impact test method while other OEMs prioritize dynamic shear test methods. In actual drops of a mobile electronic device, both tensile and shear forces are present. Consequently, it is important for the adhesive to be resistant to impact forces in both tensile and shear directions. New adhesives are needed to increase the impact and/or drop resistance of mobile devices. These new adhesives are likely to find use in other applications such as within the transportation and construction industries.

SUMMARY

Curable and cured compositions as well as articles containing the curable or cured compositions are provided. The cured compositions are typically a semi-structural or structural adhesive. As used herein, the term "semi-structural adhesive" refers to those cured compositions that have an overlap shear strength of at least 0.60 or at least 0.75 megaPascals (MPa). More preferably, the overlap shear strength is at least 1.0 or at least 1.5 MPa. Those cured compositions having a particularly high overlap shear strength, however, are referred to herein as "structural adhesives". Structural adhesives are those cured compositions that have an overlap shear strength of at least 3.5, at least, at least 4, at least 5, at least 6, or at least 7 MPa.

The cured composition can be used in various articles to attach one surface to another in the electronics, transportation, and construction industries. For example, the cured composition can be used in mobile electronic devices where impact and/or drop resistance of bonded parts is desirable or in various articles where one component is glass and another component is attached to the glass surface. The curable compositions can be in the form of a die-cut part prior to application onto components of the article for bonding the components together. The die-cut parts have good storage stability (e.g., good ooze resistance) at room temperature but are sufficiently soft (low shear modulus) to provide sufficient wet out when positioned adjacent to a first substrate during the assembly process.

Prior to assembly by positioning the die-cut part between the first substrate and a second substrate, the curable composition is typically activated by ultraviolet light. The time between activation and when lamination to the second substrate needs to occur is referred to as "open time". That is, open time refers to the time interval between light-activation and when the activated curable composition becomes too stiff to wet out and/or bond to the second substrate. The curable compositions provided herein have sufficiently long open times to achieve good adhesive characteristics when tested as fully bonded adhesive-substrate laminates.

The combination of good die-cut stability and sufficiently long open times can be achieved, at least in part, by preparation of a curable composition that includes a polyether component that can be incorporated into the cured polymeric network. More specifically, the polyether group is part of a monomeric unit within a random (meth)acrylate copolymer.

In a first aspect, a curable composition is provided that comprises a) a (meth)acrylic-based multiblock copolymer, b) a (meth)acylate copolymer comprising a monomeric unit having a pendant poly(alkylene oxide) group, wherein the monomeric unit having the pendant poly(alkylene oxide) group has a number average molecular weight of at least 300 Daltons, c) an epoxy resin, and d) a cationic photoinitiator.

In a second aspect, a cured composition comprising the reaction product of a curable composition is provided. The curable composition is the same as described above in the first aspect. The cured composition is a semi-structural or structural adhesive composition.

In a third aspect, a first article is provided that comprises a first substrate or first release liner and a curable composition positioned adjacent to the first substrate or first release liner. The curable composition is the same as described above in the first aspect. In some embodiments of the first article, the curable composition is positioned between a first release liner and a second release liner.

In a fourth aspect, a second article is provided that comprises a first substrate, a second substrate, and a cured composition positioned between the first substrate and the second substrate. The cured composition, which is the same as described above in the second aspect, bonds the first substrate to the second substrate.

In a fifth aspect, a method of making a second article is provided. The method includes preparing a curable composition as described above in the first aspect. The method further includes positioning a layer of the curable composition adjacent to a release liner to form a first article and then preparing a die-cut article from the first article. The method still further includes positioning the layer of the curable composition of the die-cut article adjacent to a first substrate and removing the release liner. The method further includes exposing the layer of the curable composition to ultraviolet radiation. The method yet further includes positioning a second substrate adjacent to the layer of the curable composition opposite the first substrate and curing the curable layer to bond the first substrate to the second substrate.

The terms "a", "an", and "the" are used interchangeably with "at least one" to mean one or more of the elements being described. The phrases "at least one of" and "comprises at least one of" followed by a list refers to any one of the items in the list and any combination of two or more items in the list.

The term "and/or" means either or both. For example, the expression X and/or Y means X, Y, or a combination thereof (both X and Y).

The term "curable" refers to a composition or component that can be cured. The terms "cured" and "cure" refer to joining polymer chains together by covalent chemical bonds to form a polymeric network. A cured polymeric network is generally characterized by insolubility, but it may be swellable in the presence of an appropriate solvent.

The term "resin component(s)" as used herein refers to the curable composition minus any inorganic material that may be present. As used herein, the resin components include, but are not limited to, a) a (meth)acrylic-based multiblock copolymer, b) a (meth)acylate copolymer comprising a pendant poly(alkylene oxide) group, c) an epoxy resin, and d) a cationic photoinitiator. Any other organic materials in the curable composition is considered to be a resin component.

The term "curable composition" refers to a total reaction mixture that is subjected to curing. The curable composition includes the resin components and any optional inorganic materials. The term "cured composition" refers to the cured reaction product of the curable composition.

The term "polymerizable component" refers to a compound that can undergo polymerization (i.e., the compound has a polymerizable group). The polymerizable component typically has an ethylenically unsaturated group such as a (meth)acryloyl-containing group or a vinyl group that is the polymerizable group. The polymerizable component can be referred to interchangeably as a "monomer". The term "macromer" refers to a monomer having a polymeric group such as a polyether group (i.e., macromers are a subset of monomers).

The term "polymerizable composition" refers to the reaction mixture that can be polymerized. It includes the polymerizable components (i.e., monomers including macromers) plus any other material such as a free radical initiator, chain transfer agent, antioxidant, solvent, and the like that may be included in the reaction mixture.

The term "(meth)acryloyl" refers to a group of formula $CH_2{=}CR{-}(C{=}O){-}$ where R is hydrogen (for an acryloyl group) or methyl (for a methacryloyl group).

The term "(meth)acrylate" refers to a methacrylate and/or acrylate. Likewise, the term (meth)acrylic acid" refers to methacrylic acid and/or acrylic acid and the term "(meth) acrylamide" refers to methacrylamide and/or acrylamide.

The term "(meth)acrylic" refers to a compound having a (meth)acryloyl group of formula $H_2C{=}CR{-}(CO){-}$ where R is hydrogen or methyl. The compounds can be monomers including macromers or polymers.

The term "monomeric unit" refers to the reaction product of a polymerizable component (i.e., a monomer (including a macromer)) within the polymeric material. As an example, the monomeric unit of acrylic acid ($H_2C{=}CH{-}(C{=}O){-}OH$) is

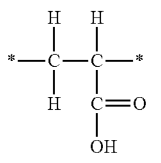

where the asterisks (*) indicate the attachment site to another group such as another monomeric unit in the polymer.

The term "poly(alkylene oxide) group" refers to a group having a plurality of alkylene oxide units. The alkylene oxide units are typically selected from ethylene oxide, propylene oxide, tetrahydrofuran oxide, or mixtures thereof.

The term "polymer" and "polymeric material" refer to homopolymers, copolymers, terpolymers, and the like. As used herein, the term "copolymer" is used herein to refer to any polymer prepared from two or more different monomers.

The term "glass transition temperature", which can be abbreviated "$T_g$" refers to the temperature at which a polymeric material transitions between being in a glassy state to being in a molten or rubbery state. The test is often performed using a rheometer as described in the Example section.

As used herein, any statement of a range includes the endpoint of the range and all suitable values within the range (e.g., 1 to 5 includes 1, 1.5, 2, 2.75, 3, 3.80, 4, 5, etc.).

As used herein, the term "room temperature" refers to a temperature of 20 to 30 degrees Celsius such as 20 to 25, 22 to 25, or 23 degrees Celsius.

The term "in the range" or "within a range" (and similar statements) includes the endpoints of the stated range.

DETAILED DESCRIPTION

A curable composition is provided that can be cured to form a cured composition that is suitable for use in electronic devices and in various industrial applications. The curable composition is typically a pressure-sensitive adhesive while the cured composition is typically a semi-structural or structural adhesive. The curable compositions, which can usually be prepared with minimal or no use of organic solvents, can be provided in the form of a die-cut article that can have good die-cut stability or good ooze resistance when stored in the dark under ambient conditions (e.g., 20 to 30 degrees Celsius and 30 to 60 percent relative humidity) for extended periods of time such as up to one year or more. The cured composition can be formed by exposure of the curable composition to ultraviolet radiation. The cured composition tends to have sufficient tensile and shear impact resistance for use in applications where impact and drop resistance are desirable.

Curable Composition

The curable composition contains (a) a (meth)acrylic-based multiblock copolymer, (b) a random (meth)acylate copolymer comprising a monomeric unit having a pendant poly(alkylene oxide) group, wherein the monomeric unit having the pendant poly(alkylene oxide) group has a number average molecular weight of at least 300 Daltons, (c) an epoxy resin, and (d) a cationic photoinitiator. Each component of the curable composition is described further below.

(Meth)Acrylic-Based Multiblock Copolymer

The curable composition includes a (meth)acrylic-based multiblock copolymer. The term "multiblock copolymer" refers to a copolymer having a plurality of different polymeric segments, which are known as "blocks". Each block can be a homopolymer (i.e., a polymeric segment formed from a single type of monomer) or a copolymer (i.e., a polymeric segment formed from multiple (i.e., two or more) different types of monomers). The boundary between adjacent blocks in the block copolymer can be sharp (i.e., the composition of the monomeric units changes abruptly at the boundary between two blocks) or tapered (i.e., the composition of the monomeric units does not change abruptly at the boundary between two blocks but is mixed in a transition region near the boundary; the transition region contains monomeric units from both adjacent blocks).

The term "triblock copolymer" refers to a multi-block copolymer having three different polymeric blocks and the term "diblock copolymer" refers to a multi-block copolymer having two different polymeric blocks. Both the triblock copolymer and the diblock copolymer contain polymeric blocks arranged in a linear manner relative to each other. Stated differently, the diblock copolymers and triblock copolymers are not star copolymers, graft copolymers, comb copolymers, dendrimers, or other macromolecules having substantially nonlinear architectures.

In most embodiments, the (meth)acrylic-based multiblock copolymer is a triblock copolymer. However, in some embodiments, the curable composition contains both a triblock copolymer and a diblock copolymer. The multiblock copolymer is usually formed predominately from (meth) acrylic-based monomers having a group $H_2C{=}CR-(CO)-$ where R is hydrogen or methyl. The (meth)acrylic-based monomers include (meth)acrylate monomers, (meth) acrylic acid monomers, (meth)acrylamide monomers, and mixtures thereof. Usually, at least 80 weight percent or more of the monomeric units in the multiblock copolymer are from (meth)acrylic-based monomers. For example, at least 85, at least 90, at least 95, at least 97, at least 98, at least 99, or 100 weight percent of the monomers used to form the (meth)acrylic-based multiblock copolymer are (meth) acrylic-based monomers. In some embodiments, the monomers are all (meth)acrylate monomers.

The triblock typically has an A-B-A structure with the A and B blocks selected to have solubility parameters that are sufficiently different to cause phase separation between the A blocks and the B block. To create the phase separation, the two A blocks and the B block of the (meth)acrylic-based triblock copolymer A-B-A are typically selected to have different glass transition temperatures. The A blocks, which typically have a higher glass transition temperature than the B, can be referred to as "hard" blocks while the B block can be referred to as a "soft" block. The A blocks are usually selected to be more rigid than the B block. The A blocks can be thermoplastic and can provide semi-structural or structural strength and/or shear strength to the adhesive composition. The B block can be a viscous material and can provide tack and adhesive strength to the adhesive composition.

The A blocks of the (meth)acrylic-based triblock copolymer A-B-A are typically selected to have a glass transition temperature ($T_g$) equal to at least 50° C. as measured using Dynamic Mechanical Analysis. In some embodiments, the glass transition temperature is at least 60° C., at least 70° C., at least 75° C., at least 80° C., at least 90° C., or at least 100° C. The glass transition temperature can be up to 200° C., up to 190° C., up to 180° C., up to 175° C., up to 170° C., up to 160° C., up to 150° C., up to 140° C., up to 130° C., up to 125° C., up to 120° C., up to 110° C., or up to 100° C. Exemplary ranges of glass transition temperatures of the A blocks include 50 to 200° C., 75 to 200° C., 70 to 175° C., 75 to 150° C., or 80 to 140° C.

The B block of the (meth)acrylic-based triblock copolymer A-B-A is a viscous segment and is typically selected to have a glass transition temperature no greater than 20° C. as measured using Dynamic Mechanical Analysis. In some embodiments, the glass transition temperature is no greater than 10° C., no greater than 5° C., no greater than 0° C., no greater than −10° C., no greater than −20° C., or no greater than −30° C. The glass transition temperature is often at least −70° C., at least −60° C., at least −50° C., at least −40° C., or at least −30° C. depending on the composition of monomers used to form the B block. Exemplary ranges for the glass transition temperature of the B block include −70 to 20° C., −70 to 10° C., −70° C. to 0° C., −50 to 0° C., −70 to −10° C., −50 to −10° C., −70 to −20° C., −50 to −20° C., −70 to −30° C., or −50 to −30° C.

The (meth)acrylic-based triblock copolymer A-B-A has two polymeric A blocks and one polymeric B block. Each of these blocks can be a homopolymer or a copolymer (i.e., a random copolymer). The (meth)acrylic-based triblock copolymer A-B-A usually contains 10 to 55 weight percent A blocks and 45 to 90 weight percent B blocks based on a total weight of the (meth)acrylic-based triblock copolymer. The (meth)acrylic-based triblock copolymer contains at least 10, at least 20, at least 25, at least 30, or at least 35 weight percent and up to 55, up to 50, up to 45, up to 40, or up to 35 weight percent A block based on the total weight of the (meth)acrylic-based triblock copolymer. The (meth)acrylic-based triblock copolymer contains at least 45, at least 50, at least 55, or at least 60 weight percent and up to 90, up to 80, up to 75, up to 70, up to 65, or up to 60 weight percent of the B block based on the total weight of the (meth)acrylic-based triblock copolymer. Together, the weight percent of the A blocks and the weight percent of the B block is nearly 100 weight percent based on the total weight of the (meth) acrylic-based triblock copolymer (i.e., there can be a small amount of initiator residue present as well). In some examples, the (meth)acrylic-based block copolymer contains 15 to 55 weight percent A blocks and 45 to 85 weight percent B block, 15 to 40 weight percent A block and 60 to 85 weight percent B block, 20 to 55 weight percent A blocks and 45 to 80 weight percent B block, 20 to 40 weight percent A block and 60 to 80 weight percent B block, or 20 to 35 weight percent A block and 65 to 80 weight percent B block.

Each of the two A blocks of the (meth)acrylic-based triblock copolymer A-B-A can be about the same weight. That is, the weight ratio of the two A blocks of the (meth) acrylic-based triblock copolymer is often 1:1 or close to 1:1 such as greater than 0.9:1. However, other weight ratios can also be used such as in a range of 0.65:1 to 0.99:1. In many cases, the weight ratio of the two A blocks of the (meth) acrylic-based triblock copolymer is no lower than 0.65:1, 0.7:1, 0.75:1, 0.8:1, 0.85:1, 0.9:1, 0.95:1, 0.98:1, or 0.99:1.

Each A block of the (meth)acrylic-based triblock copolymer A-B-A is usually prepared from a monomer composition that includes an alkyl methacrylate. Suitable alkyl methacrylates for preparing the A blocks often have an alkyl group with 1 to 10 carbon atoms, 1 to 8 carbon atoms, 1 to 6 carbon atoms, 1 to 5 carbon atoms, or 1 to 4 carbon atoms. If the alkyl group has 3 to 5 carbon atoms, it is typically branched. If the alkyl group has 6 to 10 carbon atoms, it is typically cyclic or bicyclic.

Example alkyl methacrylates include methyl methacrylate, ethyl methacrylate, isopropyl methacrylate, isobutyl methacrylate, sec-butyl methacrylate, tert-butyl methacrylate, cyclohexyl methacrylate, methylcyclohexyl methacrylate, 3,3,5-trimethylcyclohexyl methacrylate, and isobornyl methacrylate. These monomers, when polymerized as a homopolymer, have a glass transition temperature equal to at least 50° C.

In some instances, the A blocks are homopolymers and each homopolymer is a poly(alkyl methacrylate). Example poly(alkyl methacrylates) include poly(methyl methacrylate), poly(ethyl methacrylate), poly(isopropyl methacrylate), poly(isobutyl methacrylate), poly(sec-butyl methacrylate), poly(tert-butyl methacrylate), poly(cyclohexyl methacrylate), poly(methylcyclohexyl methacrylate), poly (3,3,5-trimethylcyclohexyl methacrylate), and poly(isobornyl methacrylate).

In addition to the alkyl methacrylate monomers, the first monomer composition used to form the first A block can include other optional monomers provided the resulting polymeric blocks have a glass transition temperature that is equal to at least 50° C. when measured using Dynamic Mechanical Analysis. In some embodiments, the first monomer composition can include other (meth)acrylic-based monomers such as alkoxy substituted alkyl methacrylates, aryl methacrylates, aralkyl methacrylates, aryloxy substituted alkyl methacrylate, cyclic alkyl acrylates having a cyclic group with 6 to 10 carbon atoms, bicyclic alkyl acrylates having a bicyclic alkyl group with at least 8 carbon atoms, or a mixture thereof. Suitable alkoxy substituted alkyl methacrylates often have an alkyl group with 1 to 4 carbon atoms and an alkoxy group with 1 to 4 carbon atoms. An example is 2-methoxyethyl methacrylate. Suitable aryl methacrylates typically have an aryl group with 6 to 10 carbon atoms. An example aryl methacrylate is phenyl methacrylate. Suitable aralkyl methacrylates typically have aralkyl groups with 7 to 10 carbon atoms. An example aralkyl methacrylate is benzyl methacrylate. Suitable aryloxy-substituted alkyl methacrylates often have an aryloxy-substituted alkyl group with 7 to 10 carbon atoms. An example aryloxy-substituted alkyl methacrylate is 2-phenoxyethyl methacrylate. An example cyclic alkyl acrylate is cyclohexyl acrylate and an example bicyclic acrylate is isobornyl acrylate.

In still other embodiments, the first monomer composition used to form the A blocks can include various optional (meth)acrylic-based polar monomers provided the glass transition temperature of each resulting block is equal to at least 50° C. If present, these polar monomers are usually present in an amount no greater than 10, no greater than 5, no greater than 2, or no greater than 1 weight percent based on a total weight of the monomers in the respective monomer composition. Suitable polar monomers include, for example, a hydroxy group or a glycidyl group. Typically, acidic monomers and nitrogen-containing monomers are not selected (e.g., the first monomer composition is often free of such monomers). Specific monomers include, but are not limited to, hydroxy alkyl (meth)acrylates such as 2-hydroxyethyl (meth)acrylate as 2-hydroxypropyl (meth)acrylate, as well as glycidyl (meth)acrylate. In many embodiments, however, there are no polar monomers in the A blocks.

In other embodiments, the first monomer composition used to form the A blocks can include other optional monomers that are not (meth)acrylic-based monomers provided that greater than 80 weight percent of the monomers in the block are (meth)acrylic-based monomers and provided that the resulting polymeric blocks have a glass transition temperature that is equal to at least 50° C. when measured using Dynamic Mechanical Analysis. Examples of these other monomers are vinyl monomers such as styrene, styrene-type monomers (e.g., alpha-methyl styrene, 3-methyl styrene, 4-methyl styrene, ethyl styrene, isopropyl styrene, tert-butyl styrene, dimethyl styrene, 2,4,6-trimethyl styrene, and 4-methoxy styrene), and vinyl acetate.

The A blocks of the (meth)acrylic-based triblock copolymer are often a homopolymer formed from an alkyl methacrylate and the resulting polymeric block has a glass transition temperature equal to at least 50° C. as measured using Dynamic Mechanical Analysis. In some specific embodiments, both A blocks are the same homopolymer, which is a poly(alkyl methacrylate). In some more specific embodiments, the A blocks are poly(methyl methacrylate).

The B block of the (meth)acrylic-based triblock copolymer A-B-A is typically formed from monomers that will provide polymeric blocks having a glass transition temperature no greater than 20° C. as measured using Dynamic Mechanical Analysis. The B block is often prepared from a monomer composition that includes an alkyl acrylate. Stated differently, the B block is a polymeric material formed from a second monomer composition that includes an alkyl acrylate. Suitable alkyl acrylates for forming the B block often have an alkyl group with 2 to 20, 2 to 18, 2 to 12, or 2 to 10 carbon atoms. The alkyl group can be linear, branched, cyclic, or a combination thereof (e.g., the alkyl can have a cyclic group plus a branched or linear group).

Specific examples of alkyl acrylate monomers that can be used to form the B block include, but are not limited to, ethyl acrylate, n-propyl acrylate, n-butyl acrylate, isobutyl acrylate, sec-butyl acrylate, n-pentyl acrylate, isoamyl acrylate, n-hexyl acrylate, 2-methylbutyl acrylate, 4-methyl-2-pentyl acrylate, cyclohexyl acrylate, 2-methylhexyl acrylate, n-octyl acrylate, 2-octyl acrylate, isooctyl acrylate, 2-ethylhexyl acrylate, isononyl acrylate, n-decyl acrylate, isodecyl acrylate, lauryl acrylate, isotridecyl acrylate, isostearyl acrylate, and octadecyl acrylate. Many of these monomers, when polymerized to form a homopolymer, have a glass transition temperature no greater than 20° C. when measured using Dynamic Mechanical Analysis.

In some instances, the B block is a homopolymer. Examples of homopolymers include, but are not limited to, poly(ethyl acrylate), poly(n-propyl acrylate), poly(n-butyl acrylate), poly(isobutyl acrylate), poly(sec-butyl acrylate), poly(isoamyl acrylate), poly(n-hexyl acrylate), poly(2-methylbutyl acrylate), poly(4-methyl-2-pentyl acrylate), poly(cyclohexyl acrylate), poly(2-methylhexyl acrylate), poly(n-octyl acrylate), poly(2-octyl acrylate), poly(isooctyl acrylate), poly(2-ethylhexyl acrylate), poly(isononyl acrylate), poly(n-decyl acrylate), poly(isodecyl acrylate), poly (lauryl acrylate), poly(isotridecyl acrylate), poly(isostearyl acrylate), and poly(octadecyl acrylate). In some more specific instances, the B block is poly(n-butyl acrylate), poly (n-octyl acrylate), poly(2-octyl acrylate), poly(isooctyl acrylate), poly(2-ethylhexyl acrylate), or poly(isononyl acrylate). In some even more specific instances, the B block is poly(n-butyl acrylate).

In addition to the alkyl acrylate monomers, the second monomer composition used to form the B block can further include optional monomers provided the resulting polymeric blocks has a glass transition temperature that is no greater than 20° C. when measured using Dynamic Mechanical Analysis.

In some embodiments, the second monomer composition used to form the B block can optionally include a heteroalkyl (meth)acrylate, an aralkyl acrylate, an aryloxy substituted alkyl acrylate, or an alkyl methacrylate having an alkyl group that is linear or branched with at least 6 carbon atoms. Suitable heteroalkyl acrylates include, but are not limited to 2-ethoxy ethyl (meth)acrylate, 2-methoxy ethyl acrylate, and 2-(2-ethoxyethoxy)ethyl acrylate. Suitable aralkyl acrylates include, but are not limited to, 2-biphenylhexyl acrylate and benzyl acrylate. An example aryloxy substituted alkyl acrylate is 2-phenoxy ethyl acrylate. Suitable alkyl methacrylates are n-decyl methacrylate, lauryl methacrylate, n-octyl methacrylate, isooctyl methacrylate, 2-ethylhexyl methacrylate, and n-hexyl methacrylate.

In still other embodiments, the second monomer composition used to form the B block can include various (meth) acrylic-based polar monomers provided the glass transition temperature of these blocks is no greater than 20° C. when measured using Dynamic Mechanical Analysis. If present, these polar monomers are usually present in an amount no greater than 10, no greater than 5, no greater than 2, or no greater than 1 weight percent based on a total weight of the monomers in the respective monomer composition. Suitable polar monomers include, for example, a hydroxy-substituted alkyl (meth)acrylate. The polar monomer is typically not an acidic monomer or a nitrogen containing monomer (e.g., the second monomer composition is often free of such monomers). Specific polar monomers include, but are not limited to, (meth)acrylic acid, 2-hydroxyethyl (meth)acrylate, and 2-hydroxypropyl (meth)acrylate. In many embodiments, however, there are no polar monomers in the B block.

The B block of the (meth)acrylic-based triblock copolymer is often a homopolymer formed from an alkyl acrylate and the resulting polymeric block has a glass transition temperature no greater than 20° C. as measured using Dynamic Mechanical Analysis. In some specific embodiments, the B block is a poly(alkyl acrylate). In some more specific embodiments, the B block is poly(n-butyl acrylate), poly(n-octyl acrylate), poly(2-octyl acrylate), poly(isooctyl acrylate), poly(2-ethylhexyl acrylate), or poly(isononyl acrylate).

In some (meth)acrylic-based triblock copolymers, each A block comprises monomeric units derived from methyl methacrylate and the B block comprises monomeric units derived from n-butyl (meth)acrylate such as n-butyl acrylate.

The (meth)acrylic-based triblock copolymer A-B-A often has a weight average molecular weight ($M_w$) that is at least 25, at least 30, at least 35, at least 40, at least 45, or at least 50 kiloDaltons (kDa) and up to 200, up to 190, up to 180, up to 175, up to 170, up to 160, up to 150, up to 140, up to 130, up to 125, up to 120, up to 115, up to 110, up to 100, up to 90, up to 80, or up to 75 kDa. The weight average molecular weight is often in a range of 50 to 200, 50 to 175, or 50 to 150 kDa. The weight average molecular weight is typically determined using gel permeation chromatography with polystyrene standards.

The curable composition usually contains 5 to 60 weight percent (meth)acrylic-based multiblock copolymer based on a total weight of resin components in the curable composition. The amount can be at least 5, at least 10, at least 12, at least 15, at least 20, at least 25, at least 30, at least 35, or at least 40 weight percent and up to 60, up to 55, up to 50, up to 45, up to 40, up to 35, up to 30, or up to 25 weight percent. The amount is often in a range of 5 to 50, 5 to 45, 5 to 40, 10 to 60, 10 to 50, 10 to 45, 10 to 40, 10 to 30, 15 to 60, 15 to 50, 15 to 45, 15 to 40, 15 to 35, 15 to 30, or 15 to 25 weight percent.

The (meth)acrylic-based triblock copolymer can be synthesized using any suitable technique. Suitable techniques can include, for example, anionic polymerization, radical polymerization, group transfer polymerization, and ring-opening polymerization reactions. The polymerization can be a "living" or "controlled/living" polymerization, which can advantageously produce block copolymer structures that are well defined. Specific synthesis methods include atom transfer radical polymerization (ATRP) and reversible addition-fragmentation chain transfer polymerization (RAFT) processes. Such processes are disclosed, for example, in U.S. Pat. No. 7,255,920 (Everaerts et al.), 6,734,256 (Everaerts et al.), and 6,806,320 (Everaerts et al.). Other synthesis methods include the use of controlled radical initiators that are bis-dithiocarbamate or bis-dithiocarbonate compounds such as those disclosed in U.S. Pat. No. 10,400,055 (Griesgraber et al.), 10,640,686 (Roscoe et al.), and 10,913,807 (Yurt et al.) as well as U.S. Patent Application Publication 2021/0095097 (Lewandowski et al.).

Living polymerizations can also provide block copolymers with sharp transitions between the blocks. Block copolymers having A blocks and a B block can have regions near the block borders that contain a mixture of monomeric units of A and monomeric units of B. When a living polymerization technique is used, the size of such regions can be minimized, or even eliminated, leading to a sharper transition from an A block to a B block. This can be beneficial when phase separation is desired because a region of mixed monomeric units can be compatible with both blocks, thereby reducing the phase separation. On the other hand, a sharp transition with minimal regions of mixed monomeric units can promote phase separation.

Suitable commercially available (meth)acrylic block copolymers can be obtained from under the trade designation "KURARITY" from Kuraray Co., Ltd. (Tokyo, Japan). These include, for example, KURARITY LA2330, L3320, and LA2250. Other suitable commercially available (meth) acrylic block copolymers can be obtained from under the trade designation "NANOSTRENGTH" from Arkema (Colombes, France). These include, for example, NANOSTRENGTH M51, M52, M53, M55, M65, and M75.

In addition to the triblock copolymer, the curable composition can optionally include a diblock copolymer. The diblock copolymer, which can be referred to as a C-D diblock copolymer, typically includes a C block that can prepared from the same monomers that are described above as being suitable for forming the A blocks in the triblock copolymer. Further, the D block of the diblock copolymer can be prepared from the same monomers described above as being suitable for forming the B blocks in the triblock copolymer. If a diblock is used in combination with a triblock copolymer, the A and C blocks are often formed from the same monomer(s) while the B and D blocks are often formed from the same monomer(s).

The diblock copolymer often contains 5 to 30 weight percent C block and 70 to 95 weight percent D block. The amount of the C block and be at least 5, at least 10, at least 15, or at least 20 weight percent and up to 30, up to 25, up to 20, or up to 15 weight percent based on a total weight of the diblock copolymer. The amount of the D block can be at least 70, at least 75, at least 80, at least 85 weight percent and up to 95, up to 90, up to 85, or up to 80 weight percent. The sum of the amount of the C block and D block equals (or approaches due to a small amount of initiator residue) 100 weight percent.

The weight average molecular weight of the diblock is often in a range of 30 to 150 kDa. The weight average molecular weight is often at least 30, at least 40, at least 50, at least 60, at least 70, at least 80, at least 90, or at least 100 kDa and up to 150, up to 140, up to 130, up to 120, up to 110, up to 100, up to 90, or up to 80 kDa. The weight average molecular weight can be determined by gel permeation chromatography using polystyrene standards.

The curable composition typically contains 0 to 30 weight percent of the optional (meth)acrylic-based diblock copolymer based on the total weight of resin components in the curable composition. If present, the amount can be at least 5, at least 10, at least 15, or at least 20 weight percent and up to 30, up to 25, up to 20, up to 15, or up to 10 weight percent. In many embodiments, the curable composition does not contain the optional (meth)acrylic-based diblock copolymer.

Random (Meth)Acylate Copolymer with Pendant Poly(Alkylene Oxide) Groups

The curable composition also includes a random (meth) acrylate copolymer with pendant poly(alkylene oxide) groups. This copolymer is formed from a polymerizable composition that includes a (meth)acrylate monomer having with a poly(alkylene oxide) group plus other (meth)acrylic monomers. The number average molecular weight of the (meth)acrylate monomer having the poly(alkylene oxide) group, which is referred to herein as the "(meth)acrylate macromer") is at least 300 Daltons (Da). The poly(alkylene oxide) is typically poly(ethylene oxide), poly(propylene oxide), poly(tetramethylene oxide), or a copolymer thereof. The terms "poly(tetramethylene oxide)" and "poly(tetrahydrofuran)" can be used interchangeably.

Although there are multiple methods for preparing the random (meth)acrylate copolymer with pendant poly(alkylene oxide) groups, this copolymer typically contains monomeric units derived from (a) a (meth)acrylate macromer having a pendant poly(alkylene oxide) group and (b) an alkyl (meth)acrylate. Other optional monomeric units may also be present such as those derived from a polar monomer that is free of an acidic group and free of a nitrogen-containing group. If present, the polar monomer is often a hydroxy containing monomer such as a hydroxy alkyl (meth)acrylate.

The (meth)acylate macromer is usually of Formula (II).

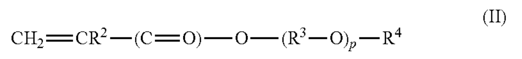

$$CH_2{=}CR^2{-}(C{=}O){-}O{-}(R^3{-}O)_p{-}R^4 \quad \text{(II)}$$

In Formula (II), the group $R^2$ is hydrogen or methyl. Each $R^3$ is independently an alkylene having 2 to 4 carbon atoms and $R^4$ is an alkyl having 1 to 4 carbon atoms. The variable p being in a range of 5 to 150. For example, the variable p is at least 5, at least 10, at least 20, at least 30, at least 40, or at last 50 and up to 150, up to 125, up to 100, up to 90, up to 80, up to 70, up to 60, up to 50, up to 40, or up to 30. The group-$(R^3{-}O)_p{-}R^4$ is usually a poly(tetramethylene oxide), polypropylene oxide), polypropylene oxide)-co-poly (ethylene oxide), or poly(ethylene oxide) group.

The number average molecular weight of the (meth) acrylate macromer with the pendant poly(alkylene oxide) group is often at least 300 or 400 Daltons (Da). While the number average molecular weight can be up to 10,000 Da, it is usually up to 5000 or 4000 Da. The number average molecular weight can be at least 300, at least 400, at least 500, at least 600, at least 800, at least 1000, at least 1200, or at least 1500 Da and up to 10,000, up to 5000, up to 4500, up to 4000, up to 3500, up to 3000, up to 2500, up to 2000, up to 1500, or up to 1000 Da. If the number average molecular weight is greater than 5000 Da, the (meth)acrylate macromer may crystallize depending on its composition. If the weight is less than 300 Da, the cured product may have inferior impact resistance. The number average molecular weight of the (meth)acylate macromer can be determined using proton Nuclear Magnetic Resonance ($^1$H-NMR).

The (meth)acrylate macromer is typically selected so that it is not waxy at room temperature. That is, the (meth) acrylate macromer is selected to be non-crystalline and a liquid at room temperature. The (meth)acrylate macromer often has a glass transition temperature (as measured using a homopolymer of the macromer) that is no greater than −20° C. For example, the glass transition temperature can be no greater than −30° C., no greater than −40° C., no greater than −50° C., or no greater than −60° C. Such a low macromer glass transition temperature imparts compliance and flexibility to the random (meth)acrylate copolymer and to the adhesive composition containing the random (meth) acrylate copolymer.

Examples of such commercially available (meth)acrylate macromers can be obtained from Millipore Sigma (Burlington, Massachusetts, USA) include poly(ethylene glycol) phenyl ether acrylate having a number average molecular weight of 324 Da, methoxy polyethylene glycol 550 acrylate (MPEG550A) having a number average molecular weight of 550 Da, poly(ethylene glycol) methyl ether acrylate having a number average molecular weight of 480 Da, poly(ethylene glycol) methyl ether acrylate having a number average molecular weight of 2,000 Da, poly(ethylene glycol) methyl ether acrylate having a number average molecular weight of 5,000 Da, and poly(propylene glycol) acrylate having a number average molecular weight of 475 Da.

Other suitable (meth)acrylate macromers are available under the tradename BISOMER from Geo Specialty Chemicals, Ambler, PA, such as BISOMER PPA6 (poly(propylene glycol) acrylate reported to have a number average molecular weight of 420 Daltons), BISOMER PEM63P HD (a mixture of poly(ethylene glycol) methacrylate and poly (propylene glycol) reported to have a number average molecular weight of 524 Daltons), BISOMER PPM5 LI (poly(propylene glycol) methacrylate reported to have a number average molecular weight of 376 Daltons), BISOMER PEM6 LD (poly(ethylene glycol) methacrylate reported to have a number average molecular weight of 350 Daltons), BISOMER MPEG350MA (methoxy poly(ethylene glycol) methacrylate) reported to have a number average molecular weight of 430 Daltons), and BISOMER MPEG550MA (methoxy poly(ethylene glycol) methacrylate reported to have a number average molecular weight of 628 Daltons). Other suitable (meth)acrylate macromers are available under the tradename MIRAMER from Miwon Specialty Chemical Company, Gyeonggi-do, Korea, such as MIRAMER M193 MPEG600MA (methoxy poly(ethylene glycol) methacrylate reported to have a number average molecular weight of 668 Daltons, MIRAMER M164 (nonyl phenol poly(ethylene glycol) acrylate reported to have a number average molecular weight of 450 Daltons), MIRAMER M1602 (nonyl phenol poly(ethylene glycol) acrylate reported to have a number average molecular weight of 390 Daltons), and MIRAMER M166 (nonyl phenol poly(ethylene glycol) acrylate reported to have a number average molecular weight of 626 Daltons. Still other suitable (meth)acrylate macromers are available from Sans Esters Corporation, New York, NY such as MPEG-A400 (methoxy poly(ethylene glycol) acrylate reported to have a number average molecular weight of 400 Daltons), and MPEG-A550 (methoxy poly(ethylene glycol) acrylate reported to have a number average molecular weight of 550 Daltons. Various combinations of such macromers may be used if desired.

In many embodiments, the polymerizable composition used to form the random (meth)acrylate copolymer contains 3 to 40 weight percent (meth)acrylate macromer. If the amount is less than 3 weight precent, the open time of the curable composition may be too short. If the amount is greater than 40 weight percent, however, the die cut stability may be inferior for being too soft. The amount can be at least 3, at least 4, at least 5, at least 10, at least 15, or at least 20 weight percent and up to 40, up to 35, up to 30, up to 25, up to 20, up to 15, or up to 10 weight percent based on the total weight of the polymerizable composition used to form the random (meth)acrylate copolymer. The amount can range, for example, from 4 to 40, 5 to 40, 5 to 35, 5 to 30, 5 to 25, 5 to 20, or 5 to 15 weight percent (meth)acylate macromer.

The polymerizable composition further includes one or more alkyl (meth)acrylate monomers. Any suitable alkyl (meth)acrylate or mixture of alkyl (meth)acrylates can be included in the polymerizable composition. The choice of the alkyl (meth)acrylate can influence the glass transition temperature of the random (meth)acrylate copolymer. Some alkyl (meth)acrylate monomers are classified as low $T_g$ monomers based on the glass transition temperature of their corresponding homopolymers. The low $T_g$ monomers, as measured from the corresponding homopolymers, often have a $T_g$ no greater than 20 degrees Celsius, no greater than 10 degrees Celsius, no greater than 0 degrees Celsius, or no greater than −10 degrees Celsius. Other alkyl (meth)acrylates are classified as high $T_g$ monomers based on the glass transition temperature of the corresponding homopolymers. The high $T_g$ monomers, as measured from the corresponding homopolymers, often have a $T_g$ greater than 30° C., greater than 40° C., or greater than 50° C. The glass transition temperature if often measured using Dynamic Mechanical Analysis (DMA).

Suitable low $T_g$ alkyl (meth)acrylate monomers include, but are not limited to, non-tertiary alkyl acrylates but can be an alkyl (meth)acrylate having a linear alkyl group with at least 4 carbon atoms. Specific examples of alkyl (meth) acrylates include, but are not limited to, n-butyl acrylate, n-butyl methacrylate, isobutyl acrylate, sec-butyl acrylate, n-pentyl acrylate, 2-methylbutyl acrylate, n-hexyl acrylate, cyclohexyl acrylate, 4-methyl-2-pentyl acrylate, 2-methylhexyl acrylate, 2-ethylhexyl acrylate, n-octyl acrylate, 2-octyl acrylate, isooctyl acrylate, isononyl acrylate, isoamyl acrylate, and combinations thereof. The alkyl (meth)acrylate monomers are typically selected to include at least one low $T_g$ monomer such as those that have a $T_g$ no greater than −10 degrees Celsius when measured as a homopolymer. Such alkyl monomers include, but are not limited to, 2-ethylhexyl acrylate, isooctyl acrylate, n-butyl acrylate, 2-methylbutyl acrylate, isooctyl acrylate, 2-octyl acrylate, and combinations thereof.

Some suitable high $T_g$ alkyl (meth)acrylate monomers include, for example, methyl methacrylate, ethyl methacrylate, n-propyl methacrylate, isopropyl methacrylate, n-butyl methacrylate, isobutyl methacrylate, sec-butyl methacrylate, tert-butyl (meth)acrylate, cyclohexyl (meth)acrylate, isobornyl (meth)acrylate, stearyl (meth)acrylate, 3,3,5 trimethylcyclohexyl (meth)acrylate, and combinations thereof.

Often, the alkyl (meth)acrylate is selected to have an alkyl group with no greater than 8 carbon atoms, no greater than 7 carbon atoms, no greater than 6 carbon atoms, no greater than 5 carbon atoms, or no greater than 4 carbon atoms to enhance miscibility of the random (meth)acrylate copolymer with other components of the curable composition.

The total amount of the alkyl (meth)acrylate can be any amount up to 30 to 97 weight percent weight percent based on the total weight of monomers within the polymerizable composition. The amount can be, for example, at least 30, at least 35, at least 40, at least 45, or at least 50 weight percent and up to 97, up to 95, up to 92, up to 90, up to 85, or up to 80 weight percent.

In addition to the alkyl (meth)acrylate and (meth)acrylate macromer, the polymerizable composition used to form the random (meth)acrylate copolymer optionally contains a polar monomer. The polar monomer contains an ethylenically unsaturated group plus a polar group. The ethylenically unsaturated group is either a vinyl or (meth)acryloyl group. Suitable polar groups can be a hydroxyl group, an ether (or polyether) group, or an epoxy group. The polar monomer is typically not an acidic monomer because of these monomers tend to be reactive at room temperature with the epoxy resin in the curable composition. Further, the polar monomer is typically not a nitrogen-containing monomer because of the reactivity of these groups with epoxy resins. That is, the polymerizable composition used to form the random (meth) acrylate copolymer is free of acidic polar monomers or contains less than 0.5, less than 0.2, less than 0.1, less than 0.05, less than 0.02, or less than 0.01 weight percent acidic polar monomers based on the total weight of the polymerizable composition. Further, the polymerizable composition used to form the random (meth)acrylate copolymer is free of nitrogen-containing polar monomers or contains less than 0.5, less than 0.2, less than 0.1, less than 0.05, less than 0.02, or less than 0.01 weight percent nitrogen-containing polar monomers based on the total weight of the polymerizable composition.

Exemplary polar monomers with a hydroxyl group include, but are not limited to, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth)acrylate), ethoxylated hydroxyethyl (meth)acrylate, and aryloxy substituted hydroxyalkyl (meth) acrylates (e.g., 2-hydroxy-2-phenoxypropyl (meth)acrylate).

Exemplary ether-containing polar monomers include those selected from 2-ethoxyethoxyethyl (meth)acrylate, 2-methoxyethoxyethyl (meth)acrylate, di(ethylene glycol)-2-ethylhexyl-ether acrylate, ethylene glycol-methyl ether acrylate, and combinations thereof. Suitable ether-containing (meth)acrylate monomers usually have a number average molecular weight less than 300 Daltons, less than 275 Daltons, or less than 250 Daltons.

The amount of any non-acidic and non-nitrogen-containing polar monomers in the polymerizable compositions used to form the random (meth)acrylate copolymer can be in a range of 0 to 30 weight percent based on the total weight of monomers in the polymerizable composition. The amount can be 0, at least 0.5, at least 1, at least 2, at least 3, at least 5, at least 10, or at least 15 weight percent and up to 30, up to 25, up to 20, up to 15, up to 10, or up to 5 weight percent based on the total weight of monomers in the polymerizable composition.

A crosslinking monomer can be optionally (but is usually) included in the polymerizable composition. The crosslinking monomer typically contains a plurality of polymerizable (meth)acryloyl groups (e.g., 2, 3, or 4 (meth)acryloyl groups). That is, the crosslinking monomer is typically a multifunctional (meth)acrylate monomer. Crosslinking the random (meth)acrylate copolymer can contribute to the dimensional stability of the curable composition.

Examples of crosslinking monomers with two (meth) acryloyl groups include, but are not limited to, glycerol di(meth)acrylate, hexanediol di(meth)acrylate, triethylene glycol di(meth)acrylate, 1,3-propanediol di(meth)acrylate, 1,6-hexanediol di(meth)acrylate, 1,4-cyclohexanediol di(meth)acrylate, urethane di(meth)acrylate, and polyethylene glycol di(meth)acrylates. Examples of crosslinking monomers with three (meth)acryloyl groups include, but are not limited to, glycerol tri(meth)acrylate, trimethylolpropane tri(meth)acrylate, 1,2,4-butanetriol tri(meth)acrylate, and pentaerythritol tri(meth)acrylate. Examples of crosslinking monomers with four or more (meth)acryloyl groups include, but are not limited to, pentaerythritol tetra(meth) acrylate, sorbitol hexa(meth)acrylate.

The polymerizable composition can contain 0 to 5 weight percent of the crosslinking monomer. If present, the amount can be at least 0.01, at least 0.05, at least 0.1, at least 0.2, at least 0.3, at least 0.5, or at least 1 weight percent and up to 5, up to 4, up to 3, up to 2, or up to 1 weight percent based on the total weight of polymerizable components in the polymerizable composition.

The polymerizable composition used to form the random (meth)acrylate copolymer often contains 3 to 40 weight percent (meth)acrylate macromer, 30 to 97 weight percent alkyl (meth)acrylate, and 0 to 30 weight percent non-acidic and non-nitrogen containing polar monomers (e.g., the polar monomer is often a hydroxy-containing monomer) based on the total weight of monomers in the polymerizable composition. In some examples, the polymerizable composition contains 5 to 30 weight percent (meth)acrylate macromer, 50 to 95 weight percent alkyl (meth)acrylate, and 0 to 20 weight percent non-acidic and non-nitrogen containing polar monomers. In other examples, the polymerizable composition contains 5 to 25 weight percent (meth)acrylate macromer, 60 to 90 weight percent alkyl (meth)acrylate, 0 to 20 weight percent non-acidic and non-nitrogen containing polar monomers. Any of these polymerizable compositions can further include 0 to 5 weight percent crosslinking monomer.

In addition to the monomers (e.g., the macromer, alkyl (meth)acylate, and optional monomers), the polymerizable composition typically includes a free-radical initiator. In many embodiments, the free-radical initiator can be a thermal initiator or a photoinitiator.

Suitable thermal initiators include various azo compound such as those commercially available under the trade designation VAZO from Chemours Co. (Wilmington, DE, USA) including VAZO 67, which is 2,2'-azobis(2-methylbutane nitrile), VAZO 64, which is 2,2'-azobis(isobutyronitrile), VAZO 52, which is (2,2'-azobis(2,4-dimethylpentanenitrile), and VAZO 88, which is 1,1'-azobis (cyclohexanecarbonitrile); various peroxides such as benzoyl peroxide, cyclohexane peroxide, lauroyl peroxide, di-tert-amyl peroxide, tert-butyl peroxy benzoate, di-cumyl peroxide, and peroxides commercially available from Atofina Chemical, Inc. (Philadelphia, PA, USA) under the trade designation LUPERSOL (e.g., LUPERSOL 101, which is 2,5-bis(tert-butylperoxy)-2,5-dimethylhexane, and LUPERSOL 130, which is 2,5-dimethyl-2,5-di-(tert-butylperoxy)-3-hexyne); various hydroperoxides such as tert-amyl hydroperoxide and tert-butyl hydroperoxide; and mixtures thereof.

In many embodiments, a photoinitiator is used to form the random (meth)acrylate copolymer. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, NJ, USA) or under the trade designation ESACURE KB-1 from Sartomer (Exton, PA, USA)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl)oxime. Other suitable photoinitiators include, for example, 1-hydroxycyclohexyl phenyl ketone (commercially available under the trade designation IRGACURE 184), bis(2,4,6-trimethylbenzoyl)phenyl phosphine oxide (commercially available under the trade designation IRGACURE 819), 1-[4-(2-hydroxyethoxy)phenyl]-2-hydroxy-2-methyl-1-propane-1-one (commercially available under the trade designation IRGACURE 2959), 2-benzyl-2-dimethylamino-1-(4-morpholinophenyl)butanone (commercially available under the trade designation IRGACURE 369), 2-methyl-1-[4-(methylthio) phenyl]-2-morpholinopropan-1-one (commercially available under the trade designation IRGACURE 907), and 2-hydroxy-2-methyl-1-phenyl propan-1-one (commercially available under the trade designation DAROCUR 1173 from Ciba Specialty Chemicals Corp. (Tarrytown, NY, USA)).

Other free radical photoinitiators are acyl phosphine oxides such as those described, for example, in U.S. Pat. No. 4,737,593 (Ellrich et al.). The acyl phosphine oxides are often of Formula (IV) or (V).

(IV)

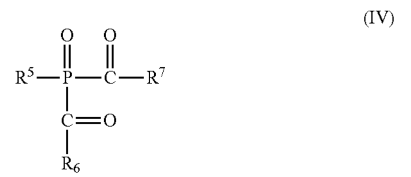

(V)

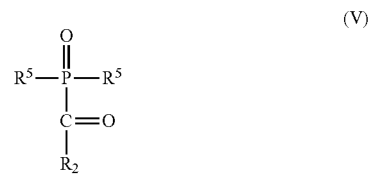

In Formulas (IV) and (V), each $R^5$ is independently a linear or branched alkyl having 1 to 18 carbon atoms, a cycloalkyl having 5 to 6 ring members (i.e., cyclopentyl and cyclohexyl), a substituted cycloalkyl, an aryl (e.g., phenyl, biphenyl, and naphthyl), a substituted aryl, or a heterocyclic ring with 5 or 6 ring members and having one or more sulfur, nitrogen, or oxygen heteroatoms. Suitable substituents for substituted aryl and substituted cycloalkyl groups include halo groups (e.g., F, Cl, Br, and I), alkyl groups (e.g., alkyl groups with 1 to 10 carbon atoms, 1 to 6 carbon atoms, or 1 to 4 carbon atom), or alkoxy groups (e.g., alkoxy groups with 1 to 10 carbon atoms, 1 to 6 carbon atoms, or 1 to 4 carbon atoms).

Each $R^6$ in Formulas (IV) and (V) is independently a cycloalkyl having 5 to 6 ring members (i.e., cyclopentyl and cyclohexyl), a substituted cycloalkyl, an aryl (e.g., phenyl, biphenyl, and naphthyl), a substituted aryl, or a heterocyclic ring having one or more sulfur, nitrogen, or oxygen heteroatoms and having 5 or 6 ring members. Suitable substituents for substituted aryl and substituted cycloalkyl groups include halo groups (e.g., F, Cl, Br, and I), alkyl groups (e.g., alkyl groups with 1 to 10 carbon atoms, 1 to 6 carbon atoms, or 1 to 4 carbon atom), or alkoxy groups (e.g., alkoxy groups with 1 to 10 carbon atoms, 1 to 6 carbon atoms, or 1 to 4 carbon atoms). Groups $R^6$ and $R^7$ in Formula (IV) can combine to form a ring that contains 4 to 10 carbon atoms that can optionally be substituted with one or more alkyl groups (e.g., 1 to 6 alkyl groups).

In some embodiments, the acyl phosphine is of Formula (IV) where $R^5$ is aryl, $R^6$ is an aryl substituted with an alkyl or alkoxy, and $R^7$ is an aryl substituted with an alky or alkoxy. In some particular embodiments, the acyl phosphine is bis(2,4,6-trimethylbenzoyl)phenyl phosphine oxide, which is commercially available under the trade designation IRGACURE 819 from Ciba Specialty Chemicals.

In other embodiments, the acryl phosphine is of Formula (V) where each $R^5$ is any aryl and $R^6$ is an aryl substituted with an alkyl or alkoxy. For example, the acyl phosphine can be diphenyl(2,4,6-trimethylbenzoyl) phosphine oxide, which is commercially available under the trade designation TPO from Millipore Sigma (formerly Sigma Aldrich), St. Louis, MO, USA.

In still other embodiments, the acyl phosphine is of Formula (V) where a first $R^5$ is an aryl, a second $R^6$ is an alkyl, and $R^6$ is an aryl substituted with an alkyl. For example, the acyl phosphine can be ethyl(2,4,6-trimethylbenzoyl)phenyl phosphinate, which is commercially available under the trade designation TPO-L from Lambson, Wetherby, West Yorkshire, England.

The amount of the free radical initiator can influence the molecular weight of the random (meth)acrylate copolymer, with larger amounts of the free radical initiator typically producing lower molecular weight polymers. The amount of the initiator is often in a range of 0.01 to 5 weight percent based on the total weight of polymerizable components in polymerizable composition. The amount can be at least 0.01, at least 0.05, at least 0.1, at least 0.2, at least 0.5, or at least 1 weight percent and up to 5, up to 4, up to 3, up to 2, up to 1, or up to 0.5 weight percent.

Chain-transfer agents optionally can be included in the polymerizable composition to control the molecular weight of the random (meth)acrylate copolymer. Suitable chain-transfer agents include, but are not limited to, those selected from the group of carbon tetrabromide, hexabromoethane, bromotrichloromethane, 2-mercaptoethanol, tert-dodecylmercaptan, isooctylthioglycoate, 3-mercapto-1,2-propanediol, cumene, pentaerythritol tetrakis(3-mercapto butyrate) (available under the trade name KARENZ MT PE 1 from Showa Denko), ethylene glycol bisthioglycolate, and mixtures thereof. Depending on the reactivity of the chain-transfer agent selected, the amount of chain transfer agent is often in a range of 0 to 5 weight percent based on the total weight of monomers in the polymerizable composition. In some embodiments, the amount of the chain transfer agent is at least 0.05 weight percent, at least 0.1 weight percent, at least 0.2 weight percent, at least 0.3 weight percent, or at least 0.5 weight percent and can be up to 5 weight percent, up to 4.5 weight percent, up to 4 weight percent, up to 3.5 weight percent, up to 3 weight percent, up to 2.5 weight percent, up to 2 weight percent, up to 1.5 weight percent, or up to 1 weight percent. The weight percent values are based on the total weight of the polymerizable components in the polymerizable composition to form the random (meth)acrylate copolymer.

The curable composition often contains 30 to 85 weight percent random (meth)acrylate copolymer based on a total weight of resin components in the curable composition. The amount can be at least 30, at least 40, at least 45, at least 50, at least 55, or at least 60 weight percent and up to 85, up to 80, up to 75, up to 70, up to 65, up to 60, up to 50, or up to 55 weight percent. For example, the amount can range from 30 to 80, 30 to 75, 30 to 70, 30 to 60, 35 to 85, 35 to 80, 35 to 70, 40 to 85, 40 to 80, 40 to 75, 40 to 70, 40 to 65, or 40 to 60 weight percent.

Epoxy Resin

The curable composition includes an epoxy resin that has at least one epoxy functional group (i.e., oxirane group) per molecule. As used herein, the term oxirane group refers to the following divalent group.

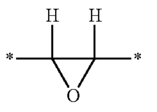

The asterisks denote a site of attachment of the oxirane group to another group. If the oxirane group is at the terminal position of the epoxy resin, the oxirane group is typically bonded to a hydrogen atom.

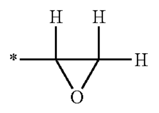

This terminal oxirane group is often (and preferably) part of a glycidyl group.

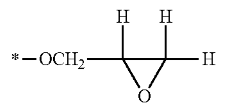

While the epoxy resin can have a single oxirane group per molecule, it often has at least two oxirane groups per molecule. For example, the epoxy resin can have 1 to 10, 2 to 10, 2 to 6, 2 to 4, or 2 oxirane groups per molecule. The oxirane groups are usually part of a glycidyl group.

Epoxy resins can be either a single material or a mixture of different materials selected to provide the desired viscosity characteristics before curing and to provide the desired mechanical properties after curing. If the epoxy resin is a mixture of materials, at least one of the epoxy resins in the mixture is typically selected to have at least two oxirane groups per molecule. For example, a first epoxy resin in the mixture can have two to four oxirane groups and a second epoxy resin in the mixture can have one to four oxirane groups. In some of these examples, the first epoxy resin is a first glycidyl ether with two to four glycidyl groups and the second epoxy resin is a second glycidyl ether with one to four glycidyl groups. In another example, a first epoxy resin in the mixture is a liquid while a second epoxy resin is a solid such as a glassy or brittle solid that is miscible with the first epoxy resin.

The portion of the epoxy resin molecule that is not an oxirane group (i.e., the epoxy resin molecule minus the oxirane groups) can be aromatic, aliphatic or a combination thereof and can be linear, branched, cyclic, or a combination thereof. The aromatic and aliphatic portions of the epoxy resin can include heteroatoms or other groups that are not reactive with the oxirane groups. That is, the epoxy resin can include halo groups, oxy groups such as in an ether linkage group, carbonyl groups, carbonyloxy groups, and the like. The epoxy resin can also be a silicone-based material such as a polydiorganosiloxane-based material.

In most embodiments, the epoxy resin includes a glycidyl ether. Exemplary glycidyl ethers can be of Formula (I).

(I)

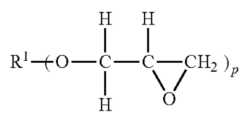

In Formula (I), group $R^1$ is a p-valent group that is aromatic, aliphatic, or a combination thereof. Group $R^1$ can be linear, branched, cyclic, or a combination thereof. Group $R^1$ can optionally include halo groups, oxy groups, carbonyl groups, carbonyloxy groups, and the like. Although the variable p can be any suitable integer greater than or equal to 1, p is often an integer in the range of 2 to 6 or 2 to 4. In many embodiments, p is equal to 2.

In some exemplary epoxy resins of Formula (I), the variable p is equal to 2 (i.e., the epoxy resin is a diglycidyl ether) and $R^1$ includes an alkylene (i.e., an alkylene is a divalent radical of an alkane and can be referred to as an alkane-diyl), heteroalkylene (i.e., a heteroalkylene is a divalent radical of a heteroalkane and can be referred to as a heteroalkane-diyl), arylene (i.e., a divalent radical of an arene compound), or mixture thereof. Suitable alkylene groups often have 1 to 20 carbon atoms, 1 to 12 carbon atoms, 1 to 8 carbon atoms, or 1 to 4 carbon atoms. Suitable heteroalkylene groups often have 2 to 50 carbon atoms, 2 to 40 carbon atoms, 2 to 30 carbon atoms, 2 to 20 carbon atoms, 2 to 10 carbon atoms, or 2 to 6 carbon atoms. The heteroatoms in the heteroalkylene are often oxy groups. Suitable arylene groups often have 6 to 18 carbon atoms, 6 to 12 carbon atoms, or 6 to 10 carbon atoms. For example, the arylene can be phenylene. Group $R^1$ can further optionally include halo groups, oxy groups, carbonyl groups, carbonyloxy groups, and the like.

Some epoxy resins of Formula (I) are diglycidyl ethers where $R^1$ includes (a) an arylene group or (b) an arylene group in combination with an alkylene, heteroalkylene, or both. Group $R^1$ can further include optional groups such as halo groups, oxy groups, carbonyl groups, carbonyloxy groups, and the like. These epoxy resins can be prepared, for example, by reacting an aromatic compound having at least two hydroxyl groups with an excess of epichlorohydrin. Examples of useful aromatic compounds having at least two hydroxyl groups include, but are not limited to, resorcinol, catechol, hydroquinone, p,p'-dihydroxydibenzyl, p,p'-dihydroxyphenylsulfone, p,p'-dihydroxybenzophenone, 2,2'-dihydroxyphenyl sulfone, and p,p'-dihydroxybenzophenone. Still other examples include the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Some commercially available diglycidyl ether epoxy resins of Formula (I) are derived from bisphenol A (i.e., bisphenol A is 4,4'-dihydroxydiphenylmethane). Examples include, but are not limited to, those available under the trade designation EPON (e.g., EPON 828, EPON 872, EPON 1001F, EPON 1004, and EPON 2004) from Hexion Specialty Chemicals, Inc. in Houston, TX, those available under the trade designation DER (e.g., DER 331, DER 332, and DER 336) from Olin Epoxy (Clayton, MO, USA), and those available under the trade designation EPICLON (e.g., EPICLON 850) from Dainippon Ink and Chemicals, Inc. in Chiba, Japan. Other commercially available diglycidyl ether epoxy resins are derived from bisphenol F (i.e., bisphenol F is 2,2'-dihydroxydiphenylmethane).

Other epoxy resins of Formula (I) are diglycidyl ethers of a poly(alkylene oxide) diol. These epoxy resins can be referred to as diglycidyl ethers of a poly(alkylene glycol) diol. The variable p is equal to 2 and $R^4$ is a heteroalkylene having oxygen heteroatoms. The poly(alkylene glycol) can be a copolymer or homopolymer. Examples include, but are not limited to, diglycidyl esters of poly(ethylene oxide) diol, diglycidyl esters of poly(propylene oxide) diol, and diglycidyl esters of poly(tetramethylene oxide) diol. Epoxy resins of this type are commercially available from Polysciences, Inc. (Warrington, PA, USA) such as those derived from a poly(ethylene oxide) diol or from a poly(propylene oxide) diol having a weight average molecular weight of about 400 Daltons, about 600 Daltons, or about 1000 Daltons. Other aliphatic epoxy resins of this type are commercially available from Nagase & Co., LTD (Osaka, Japan) under the trade designation DENACOL (e.g., DENACOL Ex-830).

Still other epoxy resins of Formula (I) are diglycidyl ethers of an alkane diol ($R^1$ is an alkylene and the variable p is equal to 2). Examples include a diglycidyl ether of 1,4-dimethanol cylcohexyl, diglycidyl ether of 1,4-butanediol, and diglycidyl ethers of the cycloaliphatic diol formed from a hydrogenated bisphenol A such as those commercially available under the trade designation EPONEX 1510 from Hexion Specialty Chemicals, Inc. (Houston, TX, USA).

Yet other epoxy resins include silicone resins with at least two glycidyl groups and flame retardant epoxy resins with at least two glycidyl groups (e.g., a brominated bisphenol-type epoxy resin having with at least two glycidyl groups such as that commercially available from Dow Chemical Company (Midland, MI, USA) under the trade designation DER 580).

The epoxy resin is often a mixture of materials. For example, the epoxy resins can be selected to be a mixture that provides the desired viscosity or flow characteristics prior to curing. The mixture can include at least one first epoxy resin that is referred to as a reactive diluent that has a lower viscosity and at least one second epoxy resin that has a higher viscosity. The reactive diluent tends to lower the viscosity of the epoxy resin mixture and often has either a branched backbone that is saturated or a cyclic backbone that is saturated or unsaturated. Examples include, but are not limited to, the diglycidyl ether of resorcinol, the diglycidyl ether of cyclohexane dimethanol, the diglycidyl ether of neopentyl glycol, and the triglycidyl ether of trimethylolpropane. Diglycidyl ethers of cyclohexane dimethanol are commercially available under the trade designation HELOXY MODIFIER 107 from Hexion Specialty Chemicals (Columbus, OH, USA) and under the trade designation EPODIL 757 from Evonik Corporation (Essen, North Rhine-Westphalia, Germany). Other reactive diluents have only one functional group (i.e., oxirane group) such as various monoglycidyl ethers. Some exemplary monoglycidyl ethers include, but are not limited to, alkyl glycidyl ethers with an alkyl group having 1 to 20 carbon atoms, 1 to 12 carbon atoms, 1 to 8 carbon atoms, or 1 to 4 carbon atoms. Some exemplary monoglycidyl ethers are commercially available under the trade designation EPODIL from Evonik Corporation such as EPODIL 746 (2-ethylhexyl glycidyl ether) and EPODIL 748 (aliphatic glycidyl ether).

The epoxy resins often have an equivalent weight in a range of 50 to 750 grams/equivalent. The equivalent weight of the epoxy resin refers to the weight of resin in grams that contains one equivalent of epoxy. The equivalent weight is often no greater than 750 grams/equivalent, no greater than 700 grams/equivalent, no greater than 650 grams/equivalent, no greater than 600 grams/equivalent, no greater than 550 grams/equivalent, no greater than 500 grams/equivalent, no greater than 450 grams/equivalent, no greater than 400 grams/equivalent, no greater than 350 grams/equivalent, no greater than 300 grams/equivalent, or no great than 250 grams/equivalent and is often at least 50 grams/equivalent, at least 75 grams/equivalent, at least 100 grams/equivalent, at least 125 grams/equivalent, or at least 150 grams/equivalent. In some embodiments, the equivalent weight is often in a range of 50 to 750 grams/equivalent, 50 to 500 grams/equivalent, 100 to 500 grams/equivalent, 100 to 300 grams/equivalent, or 150 to 250 grams/equivalent.

In many embodiments, 100 weight percent of the epoxy resin is of Formula (I). In other embodiments, at least 95 weight percent, at least 90 weight percent, at least 85 weight percent, at least 80 weight percent, at least 75 weight percent, or at least 70 weight percent of the epoxy resin is of Formula (I).

In many embodiment, 100 weight percent of the epoxy resin is a diglycidyl ether (i.e., a compound of Formula (I) with p equal to 2). In other embodiments, the epoxy resin is a mixture of compounds of Formula (I) with p equal to 2 and compounds of Formula (I) with p not equal to 2. In such mixtures, the amount of the diglycidyl ether is often at least 50 weight percent, at least 60 weight percent, at least 70 weight percent, at least 75 weight percent, at least 80 weight percent, at least 85 weight percent, at least 90 weight percent, or at least 95 weight percent based on the total weight of the epoxy resin.

In most embodiments, the epoxy resin is free of compounds that have an oxirane group that is not a glycidyl group. If such compounds are included, however, they typically make up less than 30 weight percent, less than 20 weight percent, less than 10 weight percent, less than 5 weight percent, less than 2 weight percent, less than 1 weight percent, or less than 0.5 weight percent based on the total weight of the epoxy resin.

The curable composition usually contains 10 to 50 weight percent epoxy resin based on a total weight of resin components within the curable composition. The amount can be at least 10, at least 15, at least 20, at least 25, or at least 30 weight percent and up to 50, up to 45, up to 40, up to 35, or up to 30 weight percent. For example, the amount can be in a range of 10 to 45, 10 to 40, 15 to 50, 15 to 45, 15 to 40, 20 to 50, 20 to 45, or 20 to 40 weight percent based on the total weight of resin components within the curable composition.

Cationic Photoinitiator

The cationic photoinitiator is typically selected to be sensitive to (activated by) radiation in the ultraviolet region of the electromagnetic spectrum. For example, the cationic photoinitiator is often selected to be activated at wavelengths less than or equal to 380 nanometers in the ultraviolet region of the electromagnetic spectrum.

Some suitable cationic photoinitiators are iodonium salts. Example iodonium salts include, but are not limited to, bis(4-tert-butylphenyl) iodonium hexafluoroantimonate (available under the trade designation FP5034 from Hampford Research Inc. (Stratford, CT, USA)), bis(4-tert-butylphenyl) iodonium camphorsulfonate, bis(4-tert-butylphenyl) iodonium hexafluorophosphate, bis(4-tert-butylphenyl) iodonium tetraphenylborate, bis(4-tert-butylphenyl) iodonium tosylate, bis(4-tert-butylphenyl) iodonium triflate, (4-methoxyphenyl)phenyl iodonium triflate, bis(4-methylphenyl) iodonium hexafluorophosphate (available under the trade designation OMNICAT 440 from IGM Resins (Bartlett, IL, USA)), ([4-(octyloxy)phenyl] phenyl iodonium hexafluorophosphate), ([4-(octyloxy)phenyl]phenyl iodonium hexafluoroantimonate), (4-isopropylphenyl)(4-methylphenyl) iodonium tetrakis (pentafluorophenyl) borate (available under the trade designation RHODORSIL 2074 from Bluestar Silicones (East Brunswick, NJ, USA)), and 4-(2-hydroxy-1-tetradecycloxy)phenyl]phenyl iodonium hexafluoroantimonate.

Other suitable cationic photoinitiators are triaryl sulfonium salts. Example triaryl sulfonium salts include, but are not limited to, triphenyl sulfonium hexafluoroantimonate (available under the trade designation CT-548 from Chitec Technology Corp. (Taipei, Taiwan)), diphenyl(4-phenylthio)phenyl sufonium hexafluorophosphate, diphenyl(4-phenylthio)phenyl sufonium hexafluoroantimonate, bis(4-(diphenylsulfonio)phenyl)sulfide bis(hexafluorophosphate), and bis(4-(diphenylsulfonio)phenyl)sulfide hexafluoroantimonate. Blends of triaryl sulfonium salts are available from Synasia (Metuchen, NJ, USA) under the trade designation SYNA PI-6992 for hexafluorophosphate salts and under the trade designation SYNA PI-6976 for hexafluoroantimonate salts. Mixtures of triaryl sulfonium salts are commercially available from Aceto Pharma Corporation (Port Washington, NY, USA) under the trade designations UVI-6992 and UVI-6976.

The cationic photoinitiator is typically used in an amount equal to at least 0.01 weight percent and up to 3 weight percent based on the total weight of the resin components in the curable composition. In some embodiments, the amount is at least 0.01, at least 0.02, at least 0.05, at least 0.1, at least 0.2, or at least 0.3 weight percent and up to up to 3 weight percent, up to 2 weight percent, up to 1 weight percent, up to 0.5 weight percent, up to 0.3 weight percent, or up to 0.2 weight percent based on the total weight of resin components in the curable composition.

The curable composition is typically free of both heat activated curatives and thermal acid generators for epoxy resins. Examples of such heat activated curatives include, but are not limited to, dicyandiamide (DICY). Examples of thermal acid generators include, but are not limited to, products available under the trade designations NACURE, TAG, and K-PURE from King Industries (Norwalk, CT, USA).

Optional Organic Solvents

While the presence of organic solvents is often avoided, an optional organic solvent can be present in the curable compositions. Suitable organic solvents include, but are not limited to, methanol, tetrahydrofuran, ethanol, isopropanol, pentane, hexane, heptane, acetone, methyl ethyl ketone, methyl acetate, ethyl acetate, toluene, xylene, ethylene glycol alkyl ether, propylene carbonate, and mixtures thereof. The organic solvent can be added to dissolve a reactant in the curable composition, can be added to lower the viscosity of the curable composition to facilitate its printing or dispensing, or can be a residue from the preparation of the (meth) acrylate copolymer having pendant (meth)acryloyl groups. The amount of the organic solvent in the curable composition can be in a range of 0 to 10 weight percent based on a total weight of the curable composition. In some embodiments, the amount is at least 0.5 weight percent, at least 1 weight percent, at least 2 weight percent, at least 3 weight percent, at least 4 weight percent and up to 10 weight percent, up to 9 weight percent, up to 8 weight percent, up to 7 weight percent, up to 6 weight percent, or up to 5 weight percent.

Optional Silica

Many curable compositions include optional silica particles. Silica is a thixotropic agent and is added to provide shear thinning. Silica has the effect of lowering the viscosity of the curable composition when force (shear) is applied. When no force (shear) is applied, however, the viscosity seems higher. That is, the shear viscosity is lower than the resting viscosity.

The silica particles typically have a longest average dimension that is less than 500 nanometers, less than 400 nanometers, less than 300 nanometers, less than 200 nanometers, or less than 100 nanometers. The silica particles often have a longest average dimension that is at least 5 nanometers, at least 10 nanometers, at least 20 nanometers, or at least 50 nanometers. In some embodiments, the silica particles are fumed silica. In other embodiments, the silica particles are non-aggregated nanoparticles.

The amount of the optional silica particles is at least 0.5 weight percent based on a total weight of the curable composition. The amount of the silica can be at least 1, at least 1.5, or at least 2 weight percent and can be up to 10, up to 8, or up to 5 weight percent. For example, the amount of silica can be in a range of 0.5 to 10 weight percent, 1 to 10 weight percent, 0.5 to 8 weight percent, 1 to 8 weight percent, 0.5 to 5 weight percent, or 1 to 5 weight percent.

Optional Silanes

Various silane compounds can be included in the curable composition. The silane can be added to promote adhesion to the first substrate and/or the second substrate that are bonded together with the cured composition. The silane groups have a silyl group that is particularly effective for increasing the adhesion to substrates having hydroxyl groups such as, for example, glass or ceramic surfaces. The silyl groups are often of formula $—Si(R^8)_x(OR^9)_{3-x}$ where each $R^8$ and each $R^9$ is independently an alkyl. Suitable alkyl groups for $R^8$ and $R^9$ often have 1 to 6 carbon atoms, 1 to 4 carbon atoms, or 1 to 3 carbon atoms. The variable x is 0, 1, or 2. The silyl group has at least one alkoxy group that can undergo hydrolysis and react with a siliceous surface.

The silane can be a hydrophobic or hydrophilic. That is, the silane can be of formula $R^{10}—Si(R^8)_x(OR^9)_{3-x}$ where $R^{10}$ can be a hydrophobic or hydrophilic group. Any hydrophobic or hydrophilic group can be used provided it does not interfere with the cationic polymerization of the epoxy resin. That is, $R^{10}$ usually lacks a nitrogen-containing group. In some embodiments, the silane is a hydrophilic silane and group $R^{10}$ can react with one of the components of the curable composition such as with a group on the (meth) acrylate copolymer. Such a reaction can result in the covalent attachment of the silane to the cured composition. For example, some silanes are glycidyl ether silanes where $R^{10}$ contains a glycidyl group. Examples of such silanes include, but are not limited to, (3-glyciyloxypropyl)trimethoxysilane.

The amount of the optional silane is often in a range of 0 to 10 weight percent based on a total weight of the curable composition. The amount can be at least 0.1, at least 0.2, at least 0.3, at least 0.5, or at least 1 weight percent and up to 10, up to 8, up to 6, up to 5, up to 4, up to 3, or up to 2 weight percent. For example, the amount can be in a range of 0.1 to 10, 0 to 8, 0.1 to 8, 0 to 6, 0.1 to 6, 0 to 4, 0.1 to 4, 0 to 2, or 0.1 to 2 weight percent.

Still Other Optional Components

Still other optional components include, for example, fillers, stabilizers, plasticizers, tackifiers, flow control agents, cure rate retarders, adhesion promoters (for example, titanates), impact modifiers, expandable microspheres, glass beads or bubbles, thermally conductive particles, electrically conductive particles, glass, clay, talc, pigments, colorants, and antioxidants. The optional components can be added, for example, to reduce the weight of the semi-structural or structural adhesive layer, to adjust the viscosity, to provide additional reinforcement, to modify the thermal or conductive properties, to alter the rate of curing, and the like. If any of these optional components are present, they are typically used in an amount that does not prevent the printing or dispensing of the curable composition.

In many embodiments, the curable compositions are free or substantially free of fiber reinforcement. As used herein, "substantially free" means that the curable compositions contain no greater than 1 weight percent, no greater than 0.5 weight percent, no greater than 0.2 weight percent, no greater than 0.1 weight percent, no greater than 0.05 weight percent, or no greater than 0.01 weight percent of fibers.

Overall Curable Composition

The curable composition typically includes 10 to 50 weight percent epoxy resin, 5 to 60 weight percent (meth) acrylic multiblock copolymer, 30 to 85 weight percent random (meth)acylate copolymer with pendant (alkylene oxide) groups, and 0.01 to 3 weight percent cationic photoinitiator, with all the weight percent values based on the total weight of resin components in the curable composition. The (meth)acrylic multiblock copolymer is typically a triblock copolymer. An optional (meth)acrylic diblock copolymer in an amount ranging from 0 to 30 weight percent based on the total weight of polymerizable resin components in the curable composition. The (meth)acrylic diblock, like the epoxy resin, the (meth)acrylic multiblock copolymer, the random (meth)acrylate copolymer, and the cationic photoinitiator, is classified herein as a resin component.

Some example curable compositions contain 15 to 50 weight percent epoxy resin, 10 to 50 weight percent (meth) acrylic multiblock copolymer, 30 to 80 weight percent random (meth)acylate copolymer with pendant (alkylene oxide) groups, and 0.01 to 2 weight percent cationic photoinitiator, with all the weight percent values based on the total weight of resin components in the curable composition. Other examples include 15 to 45 weight percent epoxy resin, 10 to 40 weight percent (meth)acrylic multiblock copolymer, 30 to 70 weight percent random (meth)acylate copolymer with pendant (alkylene oxide) groups, and 0.01 to 1 weight percent cationic photoinitiator, with all the weight percent values based on the total weight of resin components in the curable composition. Still other examples include 15 to 40 weight percent epoxy resin, 10 to 30 weight percent (meth)acrylic multiblock copolymer, 30 to 60 weight percent random (meth)acylate copolymer with pendant (alkylene oxide) groups, and 0.01 to 1 weight percent cationic photoinitiator, with all the weight percent values based on the total weight of resin components in the curable composition. Yet other examples contain 20 to 35 weight percent epoxy resin, 15 to 25 weight percent (meth)acrylic multiblock copolymer, 40 to 60 weight percent random (meth) acylate copolymer with pendant (alkylene oxide) groups, and 0.01 to 1 weight percent or 0.01 to 0.5 weight percent cationic photoinitiator, with all the weight percent values based on the total weight of resin components in the curable composition.

Other optional components such as those described above can be included in the curable compositions. The curable compositions, however, are typically free or substantially free of a polyol such as a liquid polyether polyol. As used with reference to a liquid polyether polyol, the term "substantially free" means less than 0.5 weight percent, less than 0.2 weight percent, less than 0.1 weight percent, less than 0.05 weight percent, less than 0.01 weight percent based on a total weight of polymerizable components in the curable composition. Liquid polyether polyols often adversely impact the ooze resistance of the curable composition if the curable compositions are in the form of die-cut parts that will be stored prior to use.

The curable composition contains both the (meth)acrylic multiblock copolymer as well as the random (meth)acrylate copolymer. Because of the presence of both polymeric materials, the curable composition advantageously can function as a pressure-sensitive adhesive. That is, the curable composition can adhere to a substate. This is helpful in positioning the curable composition prior to curing.

Method of Forming the Curable Composition

Although any suitable method can be used to prepare the curable composition, in many embodiments a precursor composition is formed initially. The precursor composition of the curable composition usually contains (1) the (meth) acrylic-based multiblock copolymer, which is often a (meth) acrylate triblock copolymer, (2) a polymerizable composition for formation of the random (meth)acrylate copolymer, (3) the epoxy resin, and (4) the cationic photoinitiator. The polymerizable composition, which is for formation of the random (meth)acrylate copolymer, in the precursor composition is often in the form of a syrup. The syrup of the polymerizable composition is a mixture of a solute polymer and solvent monomers and has a higher viscosity than the monomers alone that are used to form the random (meth) acrylate copolymer.

The formation of the precursor composition is useful in minimizing the amount of organic solvent that is needed to form a homogeneous mixture of the components included in the curable composition. The curable composition is formed from the precursor composition by polymerizing the syrup to form the random (meth)acrylate copolymer. The components of the curable composition include the polymerized random (meth)acrylate copolymer, the (meth)acrylic-based multiblock copolymer, the epoxy resin, and cationic photoinitiator. Stated differently, the curable composition contains unreacted epoxy resin but a fully (or substantially fully such as at least 95, at least 97, at least 98, or at least 99 percent) polymerized random (meth)acrylate copolymer as well as the (meth)acrylic-based multiblock copolymer.

In some first embodiments of forming a syrup for the precursor composition, the solute polymer in the syrup is the (meth)acrylic-based multiblock copolymer, which is typically a (meth)acrylic-based triblock copolymer. In this first embodiment, the solute monomers are the monomers that will be used to form the random (meth)acrylate copolymer. More particularly, the solute monomers include the alkyl (meth)acrylate, the (meth)acrylate macromer, and the optional monomers that form the monomeric units of the random (meth)acrylate copolymer.

In some second embodiments of forming a syrup for the precursor composition, the solute polymer is a partially polymerized reaction product of at least some of the monomers (or all the monomers) included in the polymerizable composition to form the random (meth)acrylate copolymer. In this second embodiment, the solute polymer is typically prepared from the alkyl (meth)acrylate monomers, optional monomers, (meth)acrylate macromer, or a mixture thereof. In some examples, the (meth)acrylate macromer is not present in the reaction mixture when the syrup polymer is prepared but is added to the syrup after preparation of the syrup polymer.

The syrups of the second embodiment can be formed using a free radical initiator, which can be either a thermal initiator or a photoinitiator. Any of the thermal and photoinitiators described above for preparation of the random (meth)acrylate copolymer can be used. The extent of this reaction is controlled by monitoring the viscosity of the syrup. For example, the reaction can be terminated when the viscosity reaches about 1000 centipoise. The reaction is halted by lowering the temperature or removing the light source for activating the initiator.

In some embodiments, the syrups of the second embodiment are formed using photoinitiators that can be activated by exposure to UV radiation at wavelengths less than 380 manometers (nm) such as in a range of 300 to less than 380 nm. For example, the free radical initiators can be activated at wavelength between 300 and 370 nm, between 330 and 370 nm, between 350 and 370 nm, or near 365 nm. One such photoinitiator is 2,2-dimethoxy-2-phenylacetophenone, obtained under the trade designation, "IRGACURE 651" from BASF (Florham Park, NJ, USA).

The syrup from either the first or second embodiment is combined with the other components of the curable composition (e.g., the epoxy resin, the cationic photoinitiator, and the (meth)acrylic multiblock copolymer if it is not present in the syrup, and additional monomers for formation of the random (meth)acrylate copolymer that are not present in the syrup) to form a precursor composition. Further, a free radical initiator such as those mentioned above for formation of the (meth)acrylic copolymer can be added. The added free radical initiator is often a phosphine oxide such as phenylbis (2,4,6-trimethylbenzoyl)phosphine oxide (commercially available under the trade designation, "IRGACURE 819" from BASF). These free radical photoinitiators can be activated by exposure to a first actinic light source. This activation results in the polymerization of the solute monomers in the syrup (e.g., the polymerization of any ethylenically unsaturated monomers in the precursor composition). The reaction product is the curable composition. To avoid inadvertently triggering both the free radical photoinitiator used to form the random (meth)acrylate copolymer and the cationic photoinitiator for polymerizing the epoxy resin simultaneously, the first actinic light source is selected so that it emits over wavelengths that are not significantly absorbed by the cationic photoinitiator.

The first actinic light source is selected to produce produces a spectral output with a peak intensity at a first wavelength that is at least 380 nanometers (nm), at least 383 nm, at least 386 nm, at least 390 nm, or at least 393 nm. The peak intensity of the first actinic light source can be at a wavelength of up to 420 nm, up to 419 nm, up to 418 nm, up to 417 nm, or up to 416 nm. The excitation dose used to activate the photoinitiator can be at least 200 $mJ/cm^2$, at least 400 $mJ/cm^2$, at least 600 $mJ/cm^2$, at least 800 $mJ/cm^2$, at least 1000 $mJ/cm^2$, at least 1500 $mJ/cm^2$, or at least 2000 $mJ/cm^2$. The excitation dose can be up to 6400 $mJ/cm^2$, up to 6000 $mJ/cm^2$, 5000 $mJ/cm^2$, up to 4000 $mJ/cm^2$, up to 3000 $mJ/cm^2$, up to 2500 $mJ/cm^2$, or up to 2000 $mJ/cm^2$.

One useful class of first actinic light sources are light emitting diodes ("LED"). LED-based ultraviolet (UV) sources are advantageous because they provide UV light over a much narrower wavelength range compared with other UV light sources such as black lights and mercury lamps. LED sources are commercially available that emit radiation, for example, at 395 nm or 405 nm.

Prior to exposure to the first wavelength of actinic radiation, the precursor composition can be applied onto a first substrate (or, alternatively, a first release liner). In many embodiments, the precursor composition is coated onto a release liner prior to exposure to the first wavelength of ultraviolet radiation. Upon exposure to the first wavelength of actinic radiation, the precursor composition undergoes a free radical polymerization reaction resulting in the formation of the random (meth)acrylate copolymer. The reaction product is a curable composition disposed on the release liner. The curable composition includes (1) the epoxy resin, (2) the (meth)acryiic multiblock copolymer, (3) the random (meth)acylate copolymer with pendant (alkylene oxide) groups, and (4) the cationic photoinitiator.

The curable composition may, in some cases, be subjected to sustained levels of stress that can induce creep and/or oozing under ambient conditions. Sources of such stress can include, for example, roll winding tensions or stacking weight. After exposure to the first actinic light source, the curable composition can be stored for an extended time with a minimal amount of creep and/or oozing. The curable composition is rendered dimensionally stable by the combined presence of the (meth)acrylic-based multiblock copolymer, which can form physical crosslinks, and the random (meth)acrylate copolymer, which can be chemically crosslinked, plus the absence of a polyol (e.g., a polyether polyol) component that is not bonded into the polymeric matrix.

Because it is dimensionally stable, the curable composition does not significantly change in length, width, or thickness over time under the force of gravity under ambient conditions (e.g., 20 to 30 degrees Celsius and 30 to 60 percent relative humidity). It is preferable for the dimensions of the curable composition to remain stable even when subjected to usual processing, handling, shipment, and storage procedures typically encountered during and after its production. In many embodiments, the curable compositions have a shelf life of at least 5 days, at least 7 days, at least 10 days, at least 14 days, at least 30 days, at least 60 days, at least 120 days, at least 180 days, at least 360 days, or at least 1 year. As used herein, "shelf life" is defined as the amount of time the curable composition remains essentially uncured when stored at ambient conditions protected from light exposure (e.g., visible and/or ultraviolet radiation).

Because of the shelf life of the curable composition, an article that contains the curable composition adhered to the first substrate or on a release liner can be prepared by a manufacturer. A customer can subsequently irradiate the curable composition with a second wavelength of light and position the irradiated composition adjacent to a second substrate. That is, the final curing step is done by the customer. If the partially curable composition is on a release liner, the release liner can be removed, and the curable composition attached to a first substrate prior to exposure to the second wavelength of actinic radiation.

The curable composition is usually a pressure-sensitive adhesive. In some embodiments, the curable composition is positioned between a first release liner and a second release liner. The first release liner can be removed for placement of the curable composition adjacent to a first substrate while the second substrate can be removed for placement of the curable composition adjacent to a second substrate.

Cured Compositions and Methods of Forming the Cured Compositions

The cured composition is a polymerized reaction product of the curable composition. The cured composition contains the (meth)acrylic-based multiblock copolymer, the random (meth)acrylate copolymer, and a polymerized (cured) epoxy resin.

Because the curable composition is typically a pressure-sensitive adhesive, it can adhere to various substrates. In many embodiments, the curable composition is positioned adjacent to a first substrate. The curable composition can then be exposed to a second wavelength of actinic radiation to commence the curing of the epoxy resin. After exposure to the second wavelength of actinic radiation, the curable composition is positioned adjacent to a second substrate. That is, the curable composition is positioned between the first substrate and the second substrate. Until curing is complete, the curable composition can adhere both substrates together by functioning as a pressure-sensitive adhesive. Upon curing, the first substrate can be bonded to the second substrate through the cured composition. The cure composition is typically a semi-structural or structural adhesive. If desired, the curable composition can be readily positioned adjacent to a second substrate such that the second substrate is adhered to the first substrate by the curable composition. That is, the curable composition, which is a pressure-sensitive adhesive, can be positioned between the first substrate and the second substrate and adheres to both substrates.

Often, the curable composition is exposed to a second wavelength of light to activate the cationic photoinitiator prior to being positioned adjacent to the second substrate. The term "second wavelength of actinic radiation" or similar terms can refer to a single wavelength or to a distribution of wavelengths that activate the cationic photoinitiator. The second wavelength is from a second light source that produces a spectral output with a peak intensity at a second wavelength $\lambda_2$ that is different than the first wavelength $\lambda_1$. The cationic photoinitiator preferentially absorbs radiation emitted by the second actinic light source relative to radiation emitted by the first actinic light source. That is, the cationic photoinitiator preferentially absorbs little or no radiation emitted by the first actinic light source.

In many embodiments, the second wavelength $\lambda_2$ is shorter than the first wavelength $\lambda_1$. Like the first light source, the second light source often has a controlled spectral output where the distribution of wavelengths is relatively narrow (or "substantially monochromatic") and centered about a characteristic second wavelength $\lambda_2$, such as a wavelength corresponding to a peak intensity. This is not critical, however, and other distributions of wavelengths, including polymodal distributions, may be feasible.

The second wavelength is selected to activate the cationic photoinitiator in the second curable composition. These compounds generate an acid when activated. In many embodiments, the second wavelength $\lambda_2$ is at least 200 nm, at least 250 nm, at least 300 nm, at least 330 nm, or at least 356 nm. The wavelength $\lambda_2$ can be less than 380 nm, up to 377 nm, or up to 374 nm.

Since the reaction of the curable composition occurs after forming the random (meth)acrylate copolymer from the precursor composition, the characteristics of second actinic light need not be as restrictive as those of the first actinic light source. The second actinic light source can be based on an LED source, as described earlier. Alternatively, the second actinic light source can be a UV black light, mercury lamp, or another broad-spectrum light source.

A UV black light is a relatively low light intensity source that provides generally 10 $mW/cm^2$ or less (as measured in accordance with procedures approved by the United States National Institute of Standards and Technology as, for example, with a UVIMAP UM 365 L-S radiometer manufactured by Electronic Instrumentation & Technology, Inc., Sterling, VA) over a wavelength range of 280 nm to 400 nm.

A mercury lamp is a higher intensity broad-spectrum UV source capable of providing intensities generally greater than 10 $mW/cm^2$, and preferably between 15 and 6000 $mW/cm^2$. For example, an intensity of 600 $mW/cm^2$ and an exposure time of about 1 second may be used successfully. Intensities can range from 0.1 $mW/cm^2$ to 6000 $mW/cm^2$ and preferably from 0.5 $mW/cm^2$ to 3000 $mW/cm^2$.

Where generally monochromatic light sources are used, the first and second actinic light sources can be selected to operate at different wavelengths; for example, they can have respective peak intensities at wavelengths separated by at least 10 nanometers, at least 15 nanometers, at least 20 nanometers, at least 25 nanometers, or at least 35 nanometers. The first and second actinic light sources can have respective peak intensities at wavelengths separated by up to 100 nanometers, up to 80 nanometers, up to 60 nanometers, up to 50 nanometers, or up to 45 nanometers.

When the curable composition is exposed to the second wavelength of actinic radiation, the epoxy resin is polymerized. The cured composition contains reaction product of the curable composition. Additionally, exposure to the second wavelength of light can induces covalent bonding between functional groups (e.g., hydroxyl groups) of the random (meth)acrylate copolymer and the epoxy resin). In this manner, the cured composition can be covalently bonded together various polymers that were in the curable composition.

The amount of time required to form a functional semi-structural or structural bond following irradiation with the second actinic light source can be at least 1 minute, at least 2 minutes, at least 5 minutes, at least 10 minutes, at least 20 minutes, at least 30 minutes, at least 1 hour, at least 2 hours, at least 4 hours, at least 8 hours, at least 12 hours, at least 18 hours, or at least 24 hours. In some cases, the periods of time specified above may be achieved by heating the adhesive composition.

Until it is fully cured, the curable composition usually and preferably has the properties of a pressure-sensitive adhesive. It is preferable that the pressure-sensitive adhesive has sufficient tack and dimensional stability to obviate the use of a clamp or other mechanism to secure the first substrate to the second substrate for the entirety of the second curing reaction. Often, a clamp or other mechanism is used in the early stages of curing the second curable composition to ensure that it adequately wets the surface to which it is adhered.

Articles

Various articles are provided. A first article includes the curable composition and at least one substrate or release liner. The second article includes a cured composition positioned between two substrates such that a first substrate is bonded to a second substrate.

The first article includes the curable composition and either a first substrate or a first release liner positioned adjacent to the first substrate or to the first release liner. The curable composition is the same as described above. Some first articles include the curable composition and a first substrate positioned adjacent to the curable composition. Optionally, a release liner can be on a surface of the curable composition opposite the first substrate. Other first articles include the curable composition and a first release liner positioned adjacent to the curable composition. Optionally, a second release liner can be on a surface of the curable composition opposite the first release liner.

Where the first substrate is flexible or where the first substrate is absent (e.g., where the article includes a first release liner and an optional second release liner), the first article can be in the form of a roll. In some rolls, there are two release liners on opposite surfaces of the curable composition. In other rolls, there is a single release liner. The articles with either one or two release liners can be transfer adhesive tapes. There articles are often die-cut parts having a shape and size consistent with the intended use of the curable composition.

In some embodiments, the article containing the curable composition can be stored adjacent to at least one release liner for any desired amount of time such as, for example, up to 1 week, up to 2 weeks, up to 1 month, up to 2 months, up to 4 months, up to 6 months, up to 8 months, up to 10 months, or up to 1 year.

The curable composition in the first article is a pressure-sensitive adhesive. In some embodiments, the first article is an adhesive transfer tape. In many embodiments, the first article does not need to be reinforced with fibers as described, for example, in U.S. Patent Application Publication 2002/0182955 (Weglewski et al.).

The terminal viscosity, measured as described in the Example section below, is at least 1 Pascal-seconds. If the value is less than 1, the curable composition tends to be too soft, and the amount of oozing (e.g., spreading of the uncurable composition beyond the edge of the release liner) will be unacceptable. The terminal viscosity is often at least 2, at last 3, at least 4, at least 5, at least 10, at least 20, at least 30, at least 40, at least 50, or at least 60 Pascal-seconds.

The first article has ooze resistance. As used herein, the term "ooze resistance" means that a first article comprising a die-cut part comprising either 1) a curable composition positioned adjacent to a first release liner or 2) a curable composition positioned between a first release liner and a second release liner) does not ooze over the edge of the die-cut part when stored in a polyethylene bag at 23 degrees Celsius for one week. The amount of ooze is zero (rated 0) if the curable composition does not move from the edge of the release liner. The amount of ooze is rated 1 if the curable composition oozes to greater than or equal 1 mm for the edge of the liner. The amount of ooze is rated 2 if the curable composition oozes 0.5 mm to less than 1 mm from the edge of the liner. The amount of ooze is rated 3 if the curable composition oozes 0.2 mm to less than 0.5 mm from the edge of the liner. The amount of ooze is rated 4 if the curable composition oozes more than 0 mm to less 0.2 mm. The amount of ooze is often rated 4 or 5 and preferably 5 after the die-cut part has been stored for 1 week at 23 degrees Celsius.

A second article includes a first substrate, a second substrate, and a cured composition positioned between the first substrate and the second substrate. The cured composition, which is the same as described above, bonds the first substrate to the second substrate. Surprisingly, the first article can have a curable composition with excellent ooze resistance yet can be used to form a second article that contains a cured composition that can function as a semi-structural adhesive with good impact resistance.

Any suitable first substrate and second substrate can be used. For example, either substrate can be flexible or inflexible and can be formed from a polymeric material, glass or ceramic material, metal (including various alloys), or combination thereof. In many embodiments, the first and/or second substrates are glass or ceramic material or metals. In other embodiments, the first substrate and/or the second substrate can be a polymeric material such as, for example, a polymeric film, a plastic composite (e.g., glass or fiber filled plastics). The polymeric material can be prepared, for example, from polyolefins (e.g., polyethylene, polypropylene, or copolymers thereof), polyurethanes, polyvinyl acetates, polyvinyl chlorides, polyesters (polyethylene terephthalate or polyethylene naphthalate), polycarbonates, polymethyl(meth)acrylates (PMMA), ethylene-vinyl acetate copolymers, and cellulosic materials (e.g., cellulose acetate, cellulose triacetate, and ethyl cellulose). These substrates are permanent substrates because they cannot be easily removed from the curable composition or the cured compositions.

Release liners can be used in the manufacture of the articles and function as temporary substrates. That is, the release liners are replaced with permanent substrates. Suitable release liners typically have low affinity for the curable composition. Exemplary release liners can be prepared from paper (e.g., Kraft paper) or other types of polymeric material. Some release liners are coated with an outer layer of a release agent such as a silicone-containing material or a fluorocarbon-containing material (e.g., polyfluoropolyether or polyfluoroethylene).

In some embodiments, the first substrate and the second substrate can be different components of an electronic device, a motorized vehicle, or a home appliance. For example, one of the substrates can be a polymeric display frame and the second substrate can be a polymeric or metallic housing within a phone, tablet, or other electronic device. Alternatively, the two substrates can be different components of a motorized vehicle, such as an automobile, truck, airplane, or the like, or different components of a home appliance, such as a refrigerator, dishwasher, oven, washing machine, or dryer. For example, one of the substrates can be glass (such as in a windshield or electronic display or shelf) and the second substrate can be a polymeric or metallic frame or bracket.

EXAMPLES

Unless otherwise noted or readily apparent from the context, all parts, percentages, ratios, etc. in the Examples and the rest of the specification are by weight.

TABLE 1

Materials Used in the Examples

| Abbreviation | Description |
|---|---|
| LA2330 | M-B-M acrylic block copolymer with a $M_w$ = 110 kDa, obtained under the trade designation “KURARITY LA2330” from Kuraray Co., Ltd., Tokyo, Japan |
| EPON 828 | Difunctional bisphenol A/epichlorohydrin derived epoxy resin with an equivalent weight of 185-192 grams/equivalent, obtained under the trade designation “EPON 828” from Hexion Inc., Columbus, Ohio, USA |
| 6976 | A cationic UV photoinitiator containing a mixture of triarylsulfonium hexafluoroantimonate salts in propylene carbonate (50% solids), obtained under the trade designation “CPI-6976” from Aceto Inc., Port Washington, New York USA |
| IRG 651 | 2,2-dimethoxy-2-phenylacetophenone, obtained under the trade designation, “IRGACURE 651” from BASF, Florham Park, New Jersey, USA |
| IRG 819 | Phenylbis(2,4,6-trimethylbenzoyl)phosphine oxide, obtained under the trade designation, “IRGACURE 819” from BASF, Florham Park, New Jersey, USA |
| 2-MBA | 2-methylbutyl acrylate can be obtained from Monomer Polymer & Dajac Labs, Ambler, PA, USA |
| nBuA | n-butyl acrylate, obtained from BASF, Florham Park, New Jersey, USA |
| 2-EHA | 2-ethylhexyl acrylate obtained from BASF, Florham Park, New Jersey, USA |
| HEA | 2-hydroxyethyl acrylate obtained from BASF, Florham Park, New Jersey, USA |
| HBA | 4-hydroxybutyl acrylate, obtained from TCI America, Portland, Oregon, USA |
| EEE-A | Di(ethylene glycol) ethyl ether acrylate having a number average molecular weight of 188 Da, obtained from Millipore Sigma, Burlington, Massachusetts, USA |
| PPEG-A | Poly(ethylene glycol) phenyl ether acrylate having a number average molecular weight of 324 Da, obtained from Millipore Sigma, Burlington, Massachusetts, USA |
| MPEGM | Poly(ethylene glycol) dimethyl ether having a number average molecular weight of 500 Da, obtained from Millipore Sigma, Burlington, Massachusetts, USA |
| MPEG-A 0.6 | Methoxy polyethylene glycol 550 acrylate (MPEG550A) having a number average molecular weight of 550 Da, obtained from Sans Esters, New York, New York, USA |
| MPEG-A 0.5 | Poly(ethylene glycol) methyl ether acrylate having a number average molecular weight of 480 Da, obtained from Millipore Sigma, Burlington, Massachusetts, USA |
| OH-PPG-A | Poly(propylene glycol) acrylate having a number average molecular weight of 475 Da, obtained from Millipore Sigma, Burlington, Massachusetts, USA |
| THF | Tetrahydrofuran, obtained from Millipore Sigma, Burlington, Massachusetts, USA r |
| MTMS | Methyl trifluoromethanesulfonate, obtained from Millipore Sigma, Burlington, Massachusetts, USA |
| MPTHF-A | Poly(tetrahydrofuran) methyl ether acrylate having a theoretical molecular weight of 3.3 kDa, synthesized as described herein. |
| HDDA | 1,6-hexanediol-diacrylate, obtained from Arkema, Colombes, France |
| RF02N | 2 mil thick PET release liner, obtained under product name RF02N from SKC, Seoul, Korea |
| RF12N | 2 mil thick PET release liner, obtained under product name RF12N from SKC, Seoul, Korea |

Test Methods

Terminal Viscosity by Dynamic Mechanical Analysis (DMA) Creep Compliance Testing of Uncured Adhesive The uncured adhesives were evaluated for their terminal viscosity by using a stress-controlled rheometer (TA Instruments discovery hybrid rheometer (DHR-3), New Castle, DE, USA) fitted with a Peltier stage and an 8 mm parallel plate geometry. The sample was laminated to 1 mm in thickness without trapping air bubbles, and an 8 mm disk was die cut from the laminate. The sample was loaded onto the 8 mm geometry and compressed onto the Peltier stage ensuring no rotation of the plate, and with an axial compressive force of 0.3 N. The temperature of the sample was equilibrated at 25° C. for 2 minutes. A stress of 8 kPa was applied to the sample at 25° C. for 3700 seconds. The linear portion of the compliance (in 1/MPa) data (typically after 1000 seconds) was plotted vs. time on a linear-linear plot. The slope of the linear portion of this line was determined from this plot. The terminal viscosity was then calculated as the reciprocal of the slope of this line.

Ooze Resistance Score Determination of Uncured Adhesive Tape

Uncured adhesive transfer tape samples (i.e., before secondary cationic cure) were assessed for ooze resistance by examination under a microscope. After circular die cutting for tensile impact testing (geometry described in tensile impact description) and waiting 1 week (stored at 23° C. in a sealed polyethylene bag) the die-cut was inspected for any ooze from the edge of the tape die cut. Samples were assigned a score from 1 to 5, with 1 being bad (poor stability and adhesive oozing equal to or more than 1 mm from the edge of the liners of the adhesive transfer tape) and 5 being good (with excellent stability and no adhesive ooze, with the adhesive remaining at 0 mm from the edge of the liners). A score of 2 was attributed to tapes that had less than 1 mm of ooze from the edge of the liners, but equal to or more than 0.5 mm of ooze from the edge of the tape. A score of 3 had less than 0.5 mm ooze, but equal to or more than 0.2 mm of ooze. A score of 4 was given to tapes that had less 0.2 mm but more than 0 mm of ooze.

Static Shear Adhesion of Cured Tape

Static Shear Adhesion was determined according to the test method of ASTM D3654/D3654M-06. The easy liner (RF02N) was removed from the 1 inch by 1 inch adhesive transfer tape (ATT) sample and laminated to the plasma treated side of 2 mil plasma primed PET (3M, 2-mil (50-μm) biaxially oriented PET film with plasma treatment conditions described in U.S. Pat. No. 10,134,566 (David et al.)), ensuring no air bubbles were trapped. The tight liner (RF12N) was then removed, and the PET/adhesive tape sample was laminated onto a 1.6 mm thick stainless steel panel using a 2.0 kg rubber roller, ensuring no air bubbles were trapped, to give a bonded article. The adhesive tape-SS substrate laminates were irradiated with 2 passes of 2 J/cm2 (1.2 W/cm2) from a 365 nm AC7300 LED light source (Excelitas Technologies, Waltham, MA, USA) followed by 30 minutes at 50° C. to expedite curing. The total UVA energy was determined using a POWER PUCK II radiometer (available from EIT Incorporated, Sterling, VA, USA). The cured article was then tested using a 1 kg weight attached to the assembly by the remaining length of PET that extended beyond the bonded area and held at 70° C. The time was measured when the adhesive sample failed to hold the weight. Samples were stopped at 10,000 minutes if they did not fail sooner.

Push Out Strength of Cured Tape

A test tape sample with PET liners on both surfaces was cut in a circular ring geometry with a 3.11 cm outer diameter, 2.61 cm inner diameter (2.5 mm bond width). The RF02N liner was removed exposing the adhesive surface and the tape was adhered to the surface of a square polycarbonate test frame (4.07×4.07×0.3 cm) with a circular hole (2.4 cm diameter) cut in the middle; wherein the tape is centered over the hole. The RF12N liner was removed from the test tape and the tape was irradiated with 2 passes of 2 J/cm2 from a 365 nm LED light source. The total UVA energy was determined using a POWERPUCK II radiometer (available from EIT Incorporated, Sterling, VA). Immediately after irradiation, a polycarbonate circular puck (3.3 cm diameter× 0.3 cm thick) was centered over the test tape and adhered to the polycarbonate frame surface using a 4 kg weight which was placed on the bonded polycarbonate puck, tape, polycarbonate frame article for 30 seconds. The weight was removed, and the cured testing fixture was allowed to dwell for 48 hours at CTH. An MTS Sintech 500/S (MTS, Eden Prairie, MN) was then used to separate the puck from the frame, which was held stationary, using a probe through the hole of the frame at a rate of 10 mm/min and the total force was recorded and three replicates were completed for each sample.

Tensile Impact of Cured Tape

Samples were prepared as described in the Push Out Strength method, except the frame and puck substrates were made of stainless steel instead of polycarbonate. The samples were tested at a drop height of 205 mm with a 3 kg mass using an Instron CEAST 9340 Drop tower (Instron, Norwood, Massachusetts, USA), wherein the impact was through the hole in the stationary frame such that the puck was separated from the frame. The total energy, peak force, and failure mode was recorded, and five replicates were completed for each sample.

Dynamic Shear of Cured Tape

A stainless-steel substrate (25.4×76.2×1.6 mm) was cleaned with methyl ethyl ketone and then dried with a KIMWIPE (Kimberly-Clark, Irving, TX). A 1" by 1" tape sample with RF02N PET liner removed, was firmly wet out to a stainless-steel substrate using finger pressure. The remaining RF12N PET liner was then removed. The adhesive was irradiated with 2 passes of 2 J/cm2 from a 365 nm LED light source. The total UVA energy was determined using a POWER PUCK II radiometer (available from EIT Incorporated, Sterling, VA). Immediately after irradiation, a second clean stainless-steel substrate was quickly bonded to the UV-cured tape. The sample was mechanically rolled with a 6.8 kg roller at 305 mm/minutes to ensure proper wet out. The cured sample was allowed to dwell for 24 hours at CTH conditions. The substrates were attached to two separated jaw hooks in an MTS Insight 30 (MTS, Eden Prairie, MN) and separated at a rate of 12.7 mm/min.

Shear Impact of Cured Tape

Two test tape samples with PET liners on both surfaces were die cut to 10 mm×10 mm. The RF02N liner of each sample was removed, and the samples were applied to opposing 10 mm×10 mm surfaces of a 10 mm×10 mm×20 mm stainless steel block. The RF12N liner was then removed, and each test tape surface was irradiated with 2 passes of 2 J/cm2 of a 365 nm LED light source. The total UVA energy was determined using a POWER PUCK II radiometer (available from EIT Incorporated, Sterling, VA). An additional 10 mm×10 mm×20 mm block was applied to each surface using 4 kg of force to give the final article of 3 blocks bonded in a chain with test tapes bonding the 3 blocks at the two junctions. The cured samples were tested at a drop height of 115 mm with a 3 kg mass using an Instron CEAST 9340 Drop tower (Instron, Norwood, Massachusetts, USA) equipped with a circular impact tip, wherein the impact of the tip was in the center of the middle stainless steel block. The total energy is reported at 1 mm displacement.

Guided Free Fall Test on Cured Tape

Samples were tested for 'guided free fall', or 'GFF' using a tensile drop configuration consisting of the adhesive bonding an aluminum frame to a polycarbonate panel (51 mm W×102 mm L×3 mm T, available from Chem Instruments, Fairfield, OH, USA). The tensile mode drop means the adhesive is being pulled in a tensile mode from the Aluminum by the polycarbonate panel when being dropped. The test is described in, US 2015/0030839 (Satrijo et al.). Briefly, the aluminum-adhesive-polycarbonate construction was assembled by first cutting the adhesive transfer tape into two 51 mm long×2 mm wide strips. The easy side liner (RF02N) was removed from each strip and they were bonded to the aluminum frame parallel to, and 14 mm away from, the outer shorter side edge of the Al frame. The tight side liner (RF12N) was removed from the strips and a polycarbonate panel was laminated to the now exposed adhesive. The adhesive bonded aluminum frame-adhesive-PC panel assembly was irradiated with 2 passes of 2 J/cm2 from a 365 nm LED light source. The total UVA energy was determined using a POWER PUCK II radiometer (available from EIT Incorporated, Sterling, VA) and allowed to dwell for 24 hours at 23° C. and 50% RH. The bonded article was then evaluated for drop resistance in a tensile mode using a drop tester (DT 202, available from Shinyei Corporation of America, New York, New York, USA) and a horizontal orientation of the bonded article with the PC substrate facing downward. The bonded article was dropped at 40 cm onto a 1.2 cm thick steel plate. Three samples were tested, the number of drops to failure recorded for each, and the average number of drops to failure was reported. If the sample did not fail at 40 cm, the sample was then dropped at 70 cm (30 drops), and then 120 cm (30 drops), if no failure at 70 cm.

Molecular Weight by Gel Permeation Chromatography (GPC)

Molar masses were determined on a Waters e2695 (Waters Corporation, Milford, MA) separations module GPC equipped with 2414 RI and 2489 UV Vis detectors. The separations were conducted using a Styragel Guard Column, 20 μm, 4.6 mm×30 mm in combination with Styragel Column, HR 5E, mixed bed, 5 μm, 7.8 mm×300 mm, 2K-4M). Sample was passed through the columns at a flow rate of 1.0 ml/minute using a THF mobile phase. The data were processed in Empower software and molar masses are reported relative to polystyrene standards.

Number Average Molecular Weight by $^1$H-NMR Spectroscopy

Nuclear Magnetic Resonance Spectroscopy was performed on a Bruker 500 MHz instrument (Bruker, Billerica, MA). $^1$H-NMR spectroscopy was performed in $CDCl_3$ solvent (residual solvent referenced to 7.26 ppm). The average molecular weight may be calculated by setting the area of an end group to a known integral (e.g., the terminal OMe end group at 3.5 ppm to 3.0) and calculating the number of repeat units from the integral corresponding to polymer peaks.

Rheology and Glass Transition Temperature

Rheological testing was performed on an TA Instruments discovery hybrid rheometer (DHR-3) (New Castle, DE). All data was collected by heating and cooling at a rate of 3° C./min at oscillatory frequencies of 1 Hz with strain values in the linear viscoelastic regime (typically <5%). The temperature is often cycled between −50° C. and 200° C. The glass transition temperature (at 1 Hz) was determined as the peak of the tan(δ) curve from the rheology plot of G' and G" (y axis-1) and tan(δ) (y axis-2) vs. temperature (° C.), (x axis). The peak (i.e., highest value) in tan(δ) was selected from y axis-2, and the corresponding temperature on the x axis was selected as the glass transition temperature. Tan(δ) is an abbreviation for the tangent of the phase angle between the stress and strain oscillation waves in the shear rheology oscillation. The measurements can be conducted using a rheometer in a shear geometry.

Sample Preparation

Synthesis of PTHF-A (3.3 kg/Mol Sample):

To a dry solvent flask with a septum, 589 grams of THF and 6.2 mL methyl trifluoromethanesulfonate initiator were added under nitrogen. After a 16 minute reaction time, 11.7 mL HBA was injected into the THF polymerization flask to quench. After quenching for 2 hours, a crude $^1$H-NMR sample was removed for analysis. By $^1$H-NMR analysis, the conversion was calculated to be about 34%. Based on this conversion, the calculated theoretical molar mass was found to be approximately 3.6 kg/mol. The majority of the residual THF was the removed by rotary evaporation, and the macromer then dissolved in methyl tert-butyl ether (approximately 500 mL, available from Millipore Sigma, Burlington, Massachusetts, USA), and washed with water (5×250 ml). The organic layer was then dried with sodium sulfate, filtered, solvent removed by rotary evaporation, and the macromer dried under high vacuum for 8 hours. After drying, the macromer was stored in a refrigerator at 4° C. prior to use. Final molar mass of dried macromer by $^1$H-NMR analysis was calculated to be 3.3 kg/mol

Examples and Comparative Examples

Syrups SRP-1 and SRP-2 were made using LA2330/ monomer mixtures, wherein SRP-1 comprises LA2330 in 2-MBA monomer (30 wt % by mass) and SRP-2 comprises LA2330 in nBuA monomer (40 wt % by mass). SRP-1 and SRP-2 were made by dissolving the LA2330 polymer in the respective monomer at the designated wt % solids at room temperature without further processing.

Syrup SRP-3 comprises 2-EHA/MPEG-A/HEA (70/20/ 10 wt % by mass, respectively) and was synthesized by adding the monomers (2EHA, MPEG-A, HEA) together at the appropriate wt % loadings, adding IRG 651 (0.02 phr with respect to total monomers at 100 phr) and exposing the monomer solution to 0.3 mW/cm$^2$ UV-LED irradiation (365 nm) until the monomer solution had a higher viscosity (ca. 1,000 cP).

Transfer tape samples were made by combining the additive raw materials (RMs) and syrups at the appropriate parts per hundred resin (phr) loadings outlined in Table 2 (raw material descriptions are in Table 1), whereby 100 phr of the syrup is used. The monomer-polymer/epoxy/initiator/ cross-linker syrup mixtures were then coated between two release liners (RF12N and RF02N from SKC Haas, Seoul, Korea, 2 mil) at an adhesive thickness of 8 mils (200 μm) and the acrylic RMs of the tape were cured under 405 nm UV-LED lights with a total dosage of 3.1 J/cm$^2$ as measured with a POWER PUCK II radiometer equipped with a high power sensing head (available from EIT Incorporated, Sterling, VA).

The curable compositions are described in both Tables 2A and 2B. Table 2B is given in weight percent based on a total weight of the resin composition in the curable composition.

TABLE 2A

| Curable Compositions (phr) | | | | | | | | | | |
|---|---|---|---|---|---|---|---|---|---|---|
| | | Additive Type and Loading (phr) | | | | | | | | |
| | | Ether Additive | | | | EPON | | IRG | | |
| Example | Syrup | Type | Loading | nBuA | HEA | 828 | LA2330 | 819 | 6976 | HDDA |
| CE-A | SRP-1 | None | — | — | — | 50 | — | 0.2 | 0.2 | 0.15 |
| CE-B | SRP-1 | MPEGM | 10 | — | — | 50 | — | 0.2 | 0.2 | 0.15 |
| CE-C | SRP-1 | MPEGM | 20 | — | — | 50 | — | 0.2 | 0.2 | 0.15 |
| CE-D | SRP-1 | MPEGM | 10 | — | 10 | 50 | — | 0.2 | 0.2 | 0.15 |
| CE-E | SRP-1 | MPEGM | 20 | — | 10 | 50 | — | 0.2 | 0.2 | 0.15 |

TABLE 2A-continued

| Curable Compositions (phr) | | | | | | | | | | | |
|---|---|---|---|---|---|---|---|---|---|---|---|
| | | Additive Type and Loading (phr) | | | | | | | | | |
| | | Ether Additive | | | | EPON | | IRG | | | |
| Example | Syrup | Type | Loading | nBuA | HEA | 828 | LA2330 | 819 | 6976 | HDDA | |
| CE-F | SRP-1 | EEE-A | 10 | — | — | 50 | — | 0.2 | 0.2 | 0.15 | |
| EX-1 | SRP-1 | PPEG-A | 10 | — | — | 50 | — | 0.2 | 0.2 | 0.15 | |
| EX-2 | SRP-1 | MPEG-A 0.6 | 10 | — | — | 50 | — | 0.2 | 0.2 | 0.15 | |
| EX-3 | SRP-1 | MPEG-A 0.6 | 20 | — | — | 50 | — | 0.2 | 0.2 | 0.15 | |
| EX-4 | SRP-1 | OH-PPG-A | 20 | — | — | 50 | — | 0.2 | 0.2 | 0.15 | |
| EX-5 | SRP-1 | MPEG-A 0.6 | 10 | — | 10 | 50 | — | 0.2 | 0.2 | 0.15 | |
| EX-6 | SRP-1 | MPEG-A 0.6 | 20 | — | 10 | 50 | — | 0.2 | 0.2 | 0.15 | |
| EX-7 | SRP-1 | OH-PPG-A | 20 | — | 10 | 50 | — | 0.2 | 0.2 | 0.15 | |
| EX-8 | SRP-2 | MPTHF-A | 10 | — | 10 | 50 | — | 0.2 | 0.2 | 0.15 | |
| EX-9 | SRP-3 | MPEG-A 0.5* | 20 | 77 | — | 100 | 50 | 0.2 | 0.2 | 0.125 | |
| EX-10 | SRP-3 | MPEG-A 0.5* | 20 | 150 | — | 100 | 100 | 0.2 | 0.2 | 0.125 | |

*Added as a monomer when synthesizing the syrup at 20 wt %, not added to syrup

TABLE 2B

| Curable Composition (weight percent) | | | | | | | | | | | | |
|---|---|---|---|---|---|---|---|---|---|---|---|---|
| | wt % Loadings in Curable Compositions | | | | | | | | | | | |
| | | | | | Ether Additive | | | EPON | IRG | IRG | | |
| Example | LA2330 | 2-MBA | BA | 2EHA | Type | Loading | HEA | 828 | 819 | 651 | 6976 | HDDA |
| CE-A | 19.9 | 46.5 | | | None | 0.0 | 0.0 | 33.2 | 0.13 | | 0.13 | 0.10 |
| CE-B | 19.9 | 46.5 | | | MPEGM | 6.6 | | 33.2 | 0.13 | | 0.13 | 0.10 |
| CE-C | 19.9 | 46.5 | | | MPEGM | 13.3 | | 33.2 | 0.13 | | 0.13 | 0.10 |
| CE-D | 18.7 | 43.6 | | | MPEGM | 6.2 | 6.2 | 31.1 | 0.12 | | 0.12 | 0.09 |
| CE-E | 18.7 | 43.6 | | | MPEGM | 12.5 | 6.2 | 31.1 | 0.12 | | 0.12 | 0.09 |
| CE-F | 19.9 | 46.5 | | | EEE-A | 6.6 | | 33.2 | 0.13 | | 0.13 | 0.10 |
| EX-1 | 19.9 | 46.5 | | | PPEG-A | 6.6 | | 33.2 | 0.13 | | 0.13 | 0.10 |
| EX-2 | 19.9 | 46.5 | | | MPEG-A 0.6 | 6.6 | | 33.2 | 0.13 | | 0.13 | 0.10 |
| EX-3 | 19.9 | 46.5 | | | MPEG-A 0.6 | 13.3 | | 33.2 | 0.13 | | 0.13 | 0.10 |
| EX-4 | 19.9 | 46.5 | | | OH-PPG-A | 13.3 | | 33.2 | 0.13 | | 0.13 | 0.10 |
| EX-5 | 18.7 | 43.6 | | | MPEG-A 0.6 | 6.2 | 6.2 | 31.1 | 0.12 | | 0.12 | 0.09 |
| EX-6 | 18.7 | 43.6 | | | MPEG-A 0.6 | 12.5 | 6.2 | 31.1 | 0.12 | | 0.12 | 0.09 |
| EX-7 | 18.7 | 43.6 | | | OH-PPG-A | 12.5 | 6.2 | 31.1 | 0.12 | | 0.12 | 0.09 |
| EX-8 | 24.9 | | 37.4 | | MPTHF-A | 6.2 | 6.2 | 31.1 | 0.12 | | 0.12 | 0.09 |
| EX-9 | 15.4 | | 23.0 | 21.5 | MPEG-A 0.5 | 6.1 | 3.1 | 30.7 | 0.06 | 0.008 | 0.06 | 0.04 |
| EX-10 | 22.2 | | 33.3 | 15.5 | MPEG-A 0.5 | 4.4 | 2.2 | 22.2 | 0.04 | 0.006 | 0.04 | 0.03 |

TABLE 3

| Adhesive Test Results | | | | | | | | | |
|---|---|---|---|---|---|---|---|---|---|
| Example | Static Shear SS (minutes) | Tensile Impact Total Force (N) | Tensile Impact Peak Force (N) | Shear Impact Total Energy (J) | Terminal Viscosity of Uncured Tape (Pa*s) | Ooze Resistance Score of Uncured Tape | Dynamic Shear Yield Stress (MPa) | Push Out Strength (N) | Total Drops in GFF (out of 90) |
| CE-A | 43 | 0.4 | 3231 | 0.2 | 0.16 | 1 | — | — | — |
| CE-B | 10,000 | 1.5 | 6270 | — | 0.01 | 1 | — | — | — |
| CE-C | 10,000 | too soft[b] | too soft[b] | too soft[b] | too soft[b] | 1 | — | — | — |
| CE-D | 10,000 | 1.7 | 7283 | — | 0.18 | 1 | — | — | — |
| CE-E | 10,000 | too soft[b] | too soft[b] | too soft[b] | too soft[b] | 1 | — | — | — |
| CE-F | 10,000 | 0.4 | 3022 | 1.6 | 0.32 | 2 | — | — | — |
| EX-1 | 208 | 0.7 | 4161 | 1.9 | 3.58 | 4 | — | — | — |
| EX-2 | 10,000 | 1.9 | 7297 | 1.7 | 4.98 | 4 | — | — | — |
| EX-3 | 10,000 | 1.4 | 6485 | 1.6 | 4.76 | 4 | — | — | — |
| EX-4 | 10,000 | 0.8 | 4855 | 0.6 | 50.25 | 5 | — | — | — |
| EX-5 | 10,000 | 1.4 | 6122 | — | 53.19 | 5 | — | — | — |
| EX-6 | 10,000 | 0.9 | 5583 | 1.5 | 94.34 | 5 | — | — | — |
| EX-7 | 10,000 | 0.9 | 5658 | 0.9 | 344.83 | 5 | — | — | — |
| EX-8 | 10,000 | 0.8 | 4975 | 1.4 | — | 5 | — | — | — |

TABLE 3-continued

| Adhesive Test Results | | | | | | | | | |
|---|---|---|---|---|---|---|---|---|---|
| Example | Static Shear SS (minutes) | Tensile Impact Total Force (N) | Tensile Impact Peak Force (N) | Shear Impact Total Energy (J) | Terminal Viscosity of Uncured Tape (Pa*s) | Ooze Resistance Score of Uncured Tape | Dynamic Shear Yield Stress (MPa) | Push Out Strength (N) | Total Drops in GFF (out of 90) |
| EX-9 | 10,000 | 1.0[a] | 3541 | 0.9 | — | 5 | 3.3 | 556 | 40 |
| EX-10 | 10,000 | 1.0[a] | 2596 | 0.7 | — | 5 | 1.7 | 327 | 75 |

[a]24 hour dwell and 300 mm

[b]Too soft to test for impact (tensile/shear modes) due to the instability of the tape die cut (geometry details in experimental section), or for terminal viscosity due to the adhesive laminate not being able to be removed from the liners in one piece.

What is claimed is:

1. A curable composition comprising:

a) a (meth)acrylic-based multiblock copolymer;

b) a random (meth)acrylate copolymer comprising monomeric units having a pendant poly(alkylene oxide) group, wherein the monomeric unit having the pendant poly(alkylene oxide) group has a number average molecular weight of at least 300 Daltons;

c) an epoxy resin; and d) a cationic photoinitiator.

2. The curable composition of claim 1, wherein the (meth)acrylic-based multiblock copolymer is a triblock copolymer of formula A-B-A where A blocks phase separate from the B block.

3. The curable composition of claim 2, wherein each A block comprises monomeric units derived from methyl methacrylate and the B block comprises monomeric units derived from n-butyl (meth)acrylate.

4. The curable composition of claim 1, wherein the curable composition comprises 5 to 60 weight percent of the (meth)acrylic-based multiblock copolymer based on a total weight of resin components in the curable composition.

5. The curable composition of claim 1, wherein the pendant (alkylene oxide) group on the random (meth)acrylate copolymer is a poly(ethylene oxide) group, a poly (propylene oxide) group, a poly(tetramethylene oxide) group, or a copolymer thereof.

6. The curable composition of claim 1, wherein the random (meth)acylate copolymer is crosslinked.

7. The curable composition of claim 1, wherein the curable composition comprises 30 to 85 weight percent random (meth)acrylate copolymer based on a total weight of resin components in the curable composition.

8. The curable composition of claim 1, wherein the curable composition comprises 10 to 50 weight percent epoxy resin based on a total weight of the resin components in the curable composition.

9. The curable composition of claim 1, wherein the curable composition is free or contains less than 0.1 weight percent of a liquid polyether polyol based on a total weight of resin components in the curable composition.

10. The curable composition of claim 1, wherein the random (meth)acrylate copolymer consists of monomeric units derived from a) a (meth)acrylate macromer having a pendent poly(alkylene oxide) group, wherein the pendant poly(alkylene oxide) group is the pendant poly(alkylene oxide) group of claim 1; b) an alkyl (meth)acrylate; and c) optionally at least one polar monomer that is free of an acidic group and free of a nitrogen-containing group.

11. A first article comprising:

a curable composition according to claim 1; and a first substrate or a first release liner positioned adjacent to a first surface of the curable composition.

12. The first article of claim 11, wherein the article comprises the curable composition, the first release liner positioned adjacent to the first surface of the curable composition, and a second release liner positioned adjacent to a second surface of the curable composition opposite the first release liner.

13. The first article of claim 11, wherein the first article is in a roll.

14. The first article of claim 11, wherein the first article is a die-cut part suitable for adhering a first component to a second component.

15. A cured composition comprising a reaction product of the curable composition of claim 1.

16. A second article comprising:

a first substate;

a second substrate; and the cured composition of claim 15 positioned between the first substrate and the second substrate, wherein the first substate is bonded to the second substrate with the cured composition.

* * * * *